(12) United States Patent
Hill et al.

(10) Patent No.: US 10,527,830 B2
(45) Date of Patent: Jan. 7, 2020

(54) OFF-AXIS REFLECTIVE AFOCAL OPTICAL RELAY

(71) Applicant: KLA-Tencor Corporation, Milpitas, CA (US)

(72) Inventors: Andrew V. Hill, Berkley, CA (US); Gregory R. Brady, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 169 days.

(21) Appl. No.: 15/391,375

(22) Filed: Dec. 27, 2016

(65) Prior Publication Data

US 2018/0045932 A1 Feb. 15, 2018

Related U.S. Application Data

(60) Provisional application No. 62/374,568, filed on Aug. 12, 2016.

(51) Int. Cl.
| | |
|---|---|
| *G02B 17/00* | (2006.01) |
| *G02B 17/02* | (2006.01) |
| *G02B 17/06* | (2006.01) |
| *G02B 21/16* | (2006.01) |
| *G02B 21/36* | (2006.01) |
| *G02B 27/00* | (2006.01) |

(52) U.S. Cl.
CPC ......... *G02B 17/008* (2013.01); *G02B 17/023* (2013.01); *G02B 17/0657* (2013.01); *G02B 17/0663* (2013.01); *G02B 21/16* (2013.01); *G02B 21/361* (2013.01); *G02B 27/0025* (2013.01)

(58) Field of Classification Search
CPC ...... G02B 17/00; G02B 17/008; G02B 17/02; G02B 17/023; G02B 17/06; G02B 17/0647; G02B 17/0657; G02B 17/0663; G02B 17/0668; G02B 17/0673; G02B 17/0684; G02B 17/08; G02B 17/0836; G02B 17/0844; G02B 17/0848; G02B 17/0864; G02B 17/0868; G02B 17/0876; G02B 21/16; G02B 21/361; G02B 27/0025

See application file for complete search history.

(56) References Cited

U.S. PATENT DOCUMENTS

| | | | |
|---|---|---|---|
| 5,608,526 | A | 3/1997 | Piwonka-Corle et al. |
| 5,859,424 | A | 1/1999 | Norton et al. |
| 6,097,550 | A | 8/2000 | Kimura |
| 6,429,943 | B1 | 8/2002 | Opsal et al. |

(Continued)

FOREIGN PATENT DOCUMENTS

KR 10-2001-0030154 A 4/2001

OTHER PUBLICATIONS

E.A. Orlenko, et al., "Off-axis parabolic mirrors: A method of adjusting them and oif measuring and corrrecting aberrations", Journal of Optical Technology, 72 (4), pp. 306-312, Apr. 2005.*

*Primary Examiner* — Stephone B Allen
*Assistant Examiner* — Adam W Booher
(74) *Attorney, Agent, or Firm* — Suiter Swantz pc llo

(57) ABSTRACT

An optical relay system includes four or more reflective optical elements oriented in a tilted configuration. Each of the four or more reflective optical elements is tilted about one of four or more tilt axes. Further, the four or more tilt axes are oriented to correct for aberrations induced by the tilted configuration.

29 Claims, 15 Drawing Sheets

(56) References Cited

U.S. PATENT DOCUMENTS

| | | | |
|---|---|---|---|
| 7,478,019 B2 | 1/2009 | Zangooie et al. | |
| 7,933,026 B2 | 4/2011 | Opsal et al. | |
| 7,933,029 B2 | 4/2011 | Tanaka | |
| 9,291,554 B2 | 3/2016 | Kuznetsov et al. | |
| 9,915,522 B1 | 3/2018 | Jiang et al. | |
| 2004/0246479 A1* | 12/2004 | Cartlidge | G01N 21/6458 356/335 |
| 2006/0268272 A1* | 11/2006 | Liphardt | G01J 3/02 356/369 |
| 2008/0213703 A1* | 9/2008 | Shafer | G02B 17/0812 430/319 |
| 2011/0194072 A1 | 8/2011 | Olivier et al. | |
| 2014/0008549 A1 | 1/2014 | Theriault et al. | |
| 2014/0172394 A1 | 6/2014 | Kuznetsov et al. | |
| 2015/0362713 A1* | 12/2015 | Betzig | G02B 21/0064 250/459.1 |

\* cited by examiner

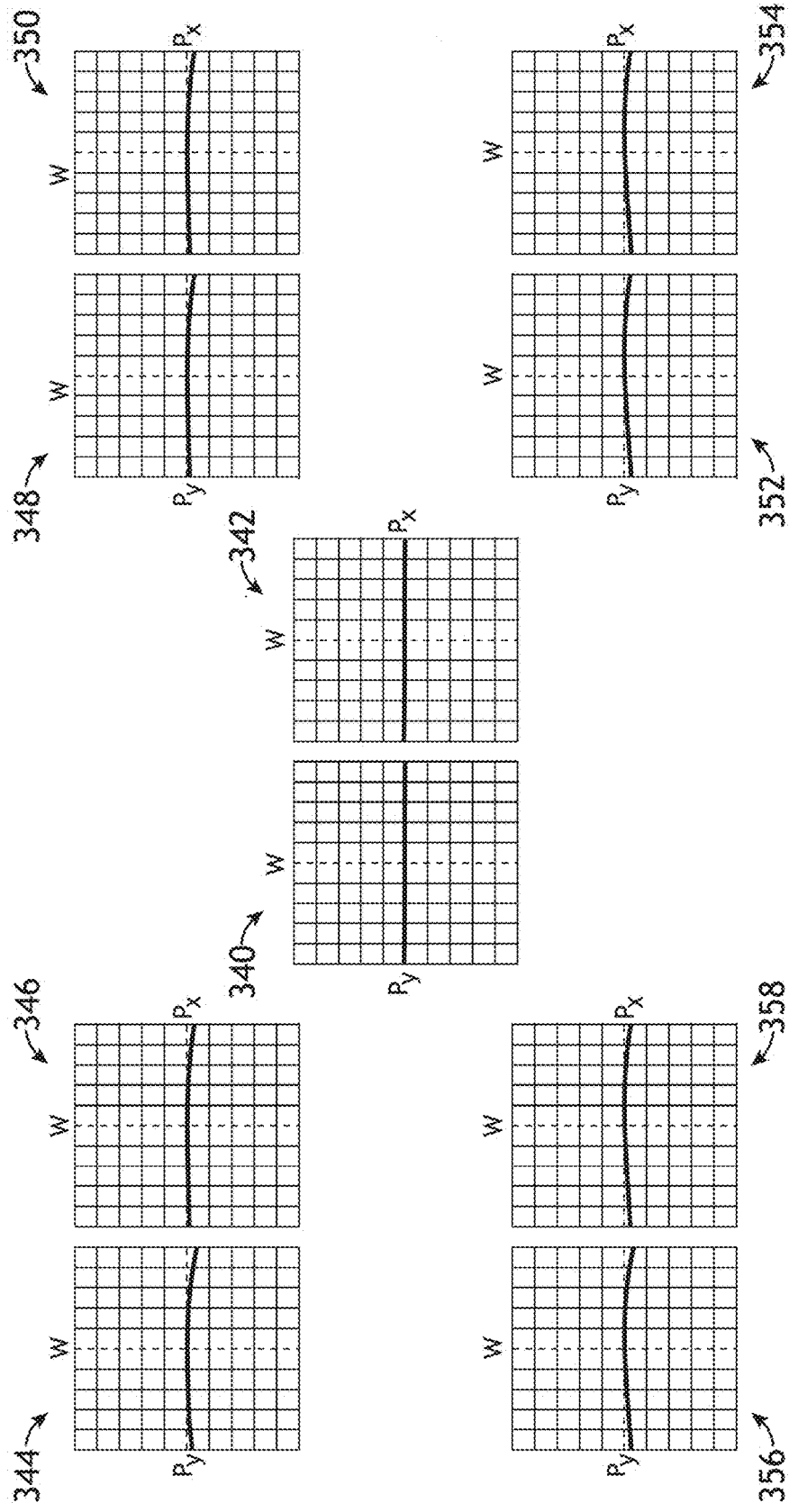

OFF-AXIS REFLECTIVE AFOCAL OPTICAL RELAY

CROSS-REFERENCE TO RELATED APPLICATION

The present application claims the benefit under 35 U.S.C. § 119(e) of U.S. Provisional Application Ser. No. 62/374,568, filed Aug. 12, 2016, entitled OFF-AXIS ASTIGMATISM-CORRECTED OPTICAL RELAY, naming Andrew V. Hill, and Gregory Brady as inventors, which is incorporated herein by reference in the entirety.

TECHNICAL FIELD

The present disclosure relates generally to optical relay systems, and more particularly, to optical relay systems with off-axis reflective elements.

BACKGROUND

Optical relay systems may typically generate an image of a particular optical plane of an optical system at another point in the optical system. For example, an optical microscope may generate an image of a sample at an intermediate plane within the microscope and include an optical relay to relay the image of the sample to a detector. As another example, an angular scatterometry system may provide a pupil plane containing angularly resolved light from a sample and an optical relay to relay the pupil plane to a detector.

Typical optical relay systems utilizing on-axis optical elements may suffer from artifacts that may degrade the relayed image. For example, on-axis refractive optical elements may generate ghost images associated with reflections from optical surfaces. Further, refractive surfaces may absorb select wavelengths of illumination (e.g. ultraviolet wavelengths) and/or induce chromatic aberration. By way of another example, on-axis reflective optical elements may typically require holes or obscurations to allow for the propagation of light that may induce artifacts in the relayed image. By way of an additional example, off-axis reflective optical elements may introduce aberrations (e.g. astigmatism, coma, or the like induced by spherical optical elements) or require relatively expensive aspherical optical elements to provide aberration-corrected relay planes.

Therefore, it would be desirable to provide a system and method for curing defects such as those of the identified above.

SUMMARY

An optical relay system is disclosed, in accordance with one or more illustrative embodiments of the present disclosure. In one illustrative embodiment, the optical relay system includes four or more reflective optical elements oriented in a tilted configuration. In another illustrative embodiment, each of the four or more reflective optical elements is tilted about one of four or more tilt axes. In another illustrative embodiment, the four or more tilt axes are oriented to correct for aberrations induced by the tilted configuration.

A metrology system is disclosed, in accordance with one or more illustrative embodiments of the present disclosure. In one illustrative embodiment, the metrology system includes an illumination source. In another illustrative embodiment, the metrology system includes an optical relay system comprising four or more reflective optical elements oriented in a tilted configuration. In another illustrative embodiment, each of the four or more reflective optical elements is tilted about one of four or more tilt axes. In another illustrative embodiment, the four or more tilt axes are oriented to correct for aberrations induced by the tilted configuration. In another illustrative embodiment, the metrology system includes an objective lens. In another illustrative embodiment, the optical relay system relays illumination from the illumination source at an input plane to an objective relay plane. In another illustrative embodiment, the objective lens directs the illumination from the illumination source at the relay plane to a sample. In another illustrative embodiment, the objective lens directs radiation emanating from the sample to the objective relay plane. In another illustrative embodiment, the optical relay system relays the radiation emanating from the sample at the relay plane to the input plane. In another illustrative embodiment, the metrology system includes a detector. In another illustrative embodiment, the metrology system includes one or more collection optical elements to direct the radiation emanating from the sample at the relay plane to the detector.

A metrology system is disclosed, in accordance with one or more illustrative embodiments of the present disclosure. In one illustrative embodiment, the metrology system includes an illumination source. In another illustrative embodiment, the metrology system includes an objective lens. In another illustrative embodiment, the metrology system includes a detector. In another illustrative embodiment, the metrology system includes a first optical relay sub-system. In another illustrative embodiment, the first optical relay sub-system includes a first reflective optical element tilted about a first tilt axis and a second reflective optical element tilted about a second tilt axis. In another illustrative embodiment, the first optical relay sub-system relays illumination from the illumination source at an illumination plane to an intermediate relay plane. In another illustrative embodiment, the metrology system includes a second optical relay sub-system. In another illustrative embodiment, the second optical relay sub-system includes a third reflective optical element tilted about a third tilt axis and a fourth reflective optical element tilted about a fourth tilt axis. In another illustrative embodiment, the second optical relay sub-system relays the illumination from the illumination source at the intermediate relay plane to an objective relay plane. In another illustrative embodiment, the first, second, third, and fourth reflective optical elements are oriented in a first tilted configuration. In another illustrative embodiment, the first, second, third, and fourth tilt axes are oriented to correct for aberrations induced by the first tilted configuration. In another illustrative embodiment, the objective lens directs the illumination from the illumination source to a sample. In another illustrative embodiment, the objective lens directs radiation emanating from the sample to the objective relay plane. In another illustrative embodiment, the second optical relay sub-system relays the radiation emanating from the sample at the objective relay plane to the intermediate relay plane. In another illustrative embodiment, the metrology system includes a third optical relay sub-system. In another illustrative embodiment, the second optical relay sub-system includes a fifth reflective optical element tilted about a fifth tilt axis and a sixth reflective optical element tilted about a sixth tilt axis. In another illustrative embodiment, the third optical relay sub-system relays the radiation emanating from the sample at the intermediate relay plane to the detector. In another illustrative embodiment, the third, fourth, fifth, and sixth reflective optical elements are oriented in a second tilted configuration. In another illustrative embodiment, the third, fourth, fifth, and sixth tilt axes are oriented to correct for aberrations induced by the second tilted configuration.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 3E is a series of wavefront aberration plots associated with rays propagating through a first pupil relay sub-system and a second pupil relay sub-system, and also passing through points of the field plane of FIG. 3B, in accordance with one or more embodiments of the present disclosure.

DETAILED DESCRIPTION

Figure 1:
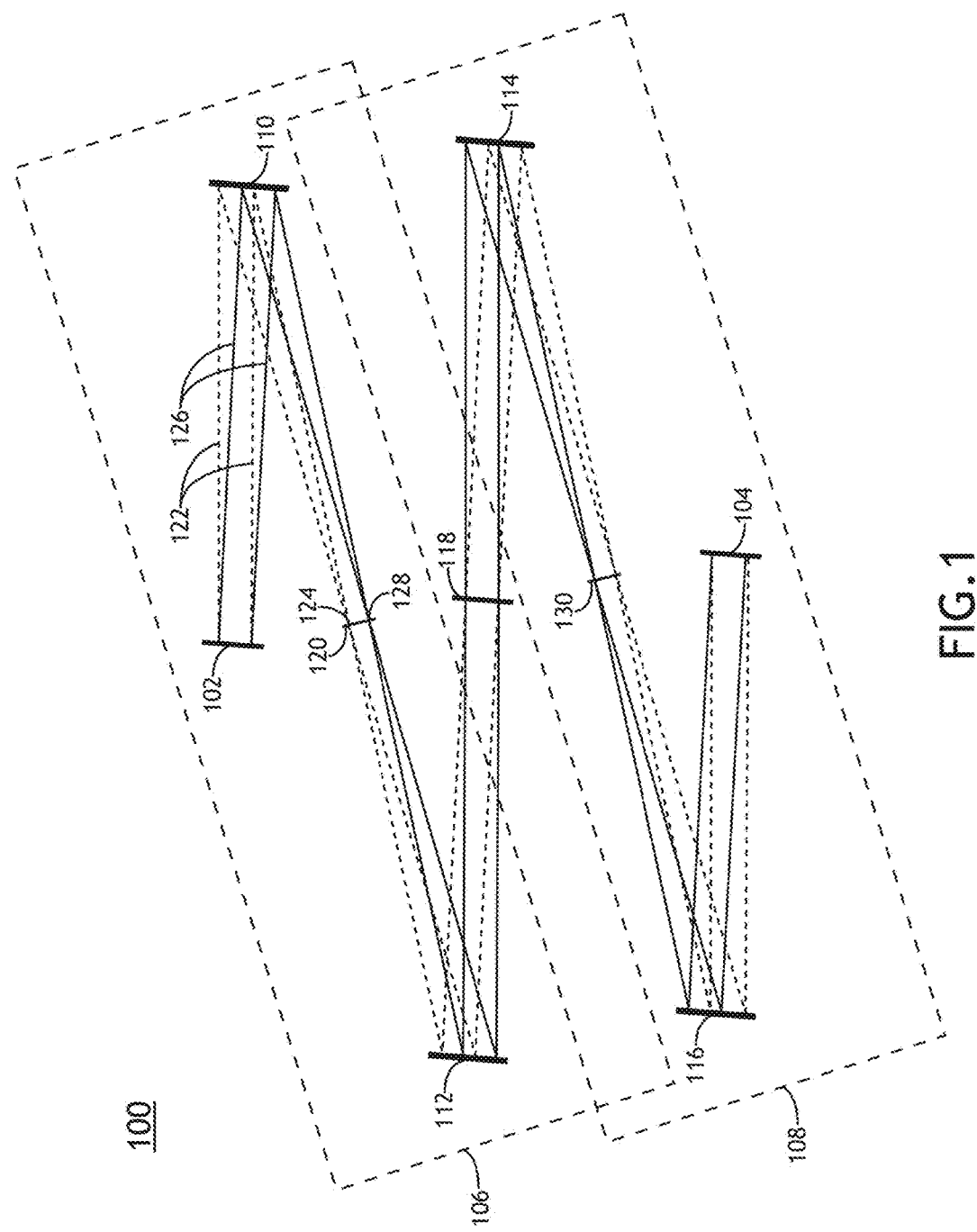
FIG. 1 is a conceptual view of a pupil relay, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Referring generally to FIGS. 1 through 5C, systems and methods for relaying an optical plane using off-axis elements oriented such that the relayed optical plane is corrected for aberrations are disclosed, in accordance with one or more embodiments of the present disclosure. Embodiments of the present disclosure are directed to relaying an optical plane using reflective spherical optical elements tilted (e.g. in an off-axis configuration) such that the relayed optical plane does not suffer from obscurations. Additional embodiments of the present disclosure are directed to relaying an optical plane using reflective spherical elements oriented such that the relayed optical plane does not suffer from aberrations induced by the tilted reflective spherical optical elements. Further embodiments are directed to optical systems including optical relays corrected for astigmatism and/or coma. For example, some embodiments of the present disclosure are directed to relaying an image of a pupil (e.g. an entrance pupil, an exit pupil, or the like) with off-axis reflective elements oriented to compensate for off-axis aberrations. Additional embodiments are directed to an angular scatterometer including an aberration-corrected off-axis optical relay to provide a pupil image on a detector.

It is recognized herein that an optical system may typically include two reciprocal planes: a field plane (e.g. a plane conjugate to an object) and a pupil plane (e.g. a plane conjugate to a diffraction plane). Light emanating from a particular point of a field plane at any angle may be imaged to a corresponding particular point in a conjugate field plane. Conversely, light emanating from a field plane at a particular angle, regardless of the location in the field plane, may be focused to a particular point in a pupil plane. In this regard, a pupil plane may correspond to a diffraction pattern of the field plane. Further, light from a single point in a field plane may be incident on all points of a subsequent pupil plane, while light from a single point in a pupil plane may be incident on all points of a subsequent field plane.

An optical relay system may relay a distribution of light from one optical plane to another. For example, an optical relay system may relay a field plane associated with an object. Accordingly, the optical relay system will provide a relayed image of an object. By way of another example, an optical relay system may relay a pupil plane associated with a diffraction pattern of an object. In this regard, the optical relay system may operate as a pupil relay system (e.g. an afocal pupil relay) such that the object and image conjugates are at infinity. Accordingly, light from the object (or a conjugate field plane) may enter the entrance pupil (and exit the exit pupil) of the optical relay as parallel beams with different incidence angles corresponding to position on the object. For the purposes of the present disclosure, descriptions of a pupil relay are provided as instances of an optical relay and should not be interpreted as limiting. In this regard, any descriptions or figures associated with a pupil relay may be equivalently applied to any relay system configured to relay any optical plane.

An input or exit distribution of light from an optical relay may be nonplanar. For example, an optical relay may map a planar object to a curved image. By way of another example, an optical plane may map a curved object to an image field of any distribution. For the purposes of the present disclosure, the term optical plane may interchangeably refer to a planar or nonplanar distribution of light.

The design of an optical system, including an optical relay system, may be influenced by application-specific constraints. For example, in some applications, it may be desirable to provide an optical relay system capable of generating an aberration-corrected relayed image over a broad range of wavelengths. In this regard, the application-specific constraints may influence tradeoffs associated with designing the optical system. For example, refractive optical elements are typically formed from dispersive materials and typically exhibit at least some degree of chromatic aberration, which may limit the spectral bandwidth of an optical system. Further, refractive optical elements may limit the spectral bandwidth of an optical system through absorption of select wavelengths of light (e.g. ultraviolet wavelengths, vacuum ultraviolet wavelengths, deep ultraviolet wavelengths, extreme ultraviolet wavelengths, or the like). Additionally, it may be the case that reflections from surfaces of refractive elements may generate spurious images (e.g. "ghost images") in an optical system that may degrade the performance of the system.

Reflective optical elements may typically provide a different set of design tradeoffs than refractive optical elements. For example, reflective optical elements may typically provide relatively fewer limitations on the spectral bandwidth of an optical system than refractive optics, but may require particular care to mitigate aberrations. In one regard, reflective optical elements arranged in an on-axis configuration (e.g. oriented symmetrically about a common optical axis) may require holes and/or obscurations to allow light to pass between optical elements. Accordingly, the holes and/or obscurations may introduce artifacts and/or aberrations that may degrade performance. In another regard, reflective optical elements arranged in an off-axis configuration (e.g. tilted with respect to optical axes of individual elements) may require aspherical profiles to mitigate off-axis aberrations (e.g. astigmatism, coma, or the like).

The use of aspherical optical elements for off-axis optical systems may be associated with additional design tradeoffs. For example, it is recognized herein that spherical optical elements (e.g. optical elements with surfaces corresponding to portions of spheres) are commonly utilized and may be manufactured within tight tolerances. Alternatively, aspherical optical elements may typically be relatively more expensive to manufacture than spherical optical elements. Further, manufacturing processes used to fabricate aspherical optical elements may tend to produce irregularities with mid-spatial frequencies that may be problematic for some applications. As an illustrative example, angular spectrometry may be particularly sensitive to mid-spatial frequency noise associated with manufacturing irregularities of optical elements. It may be the case that high-spatial frequency noise (e.g. associated with roughness on an optical element, or the like) may be mitigated through the use of field stops. Further, low-spatial frequency noise may tend to affect the size of illumination lobes in a pupil plane. However, mid-spatial frequency noise may increase the size of spot tails, which may be truncated and diffracted by field stops and lead to performance degradations.

Some embodiments of the present disclosure are directed to optical pupil-plane relays (e.g. pupil relays) including off-axis reflective spherical optical elements oriented such that a relayed pupil plane is corrected for aberrations (e.g. astigmatism, coma, or the like). Additional embodiments are directed to optical pupil-plane relays in which one or more optical elements are oriented to at least partially correct for aberrations induced by one or more previous optical elements.

Additionally, it is noted that optical relay systems may be utilized in a wide range of applications. Accordingly the spirit and scope of the present disclosure is not limited to pupil relays and may extend to any application of an optical relay.

FIG. 1 is a conceptual view of a pupil relay 100, in accordance with one or more embodiments of the present disclosure. In one embodiment, the pupil relay 100 provides a relayed version of an input pupil plane 102 at a relayed pupil plane 104. In another embodiment, the pupil relay 100 includes two or more cascaded pupil relay sub-systems. For example, as illustrated in FIG. 1, the pupil relay 100 may include a first pupil relay sub-system 106 and a second pupil relay sub-system 108. In this regard, the first pupil relay sub-system 106 may include a first reflective optical element 110 and a second reflective optical element 112. Further, the second pupil relay sub-system 108 may include a third reflective optical element 114 and a fourth reflective optical element 116.

In another embodiment, a distribution of light in an input pupil plane 102 is sequentially relayed by each pupil relay sub-system of the pupil relay 100 to provide a series of pupil planes conjugate to the input pupil plane 102. For example, the first pupil relay sub-system 106 may generate a relayed version of the input pupil plane 102 at an intermediate pupil plane 118. Additionally, the intermediate pupil plane 118 may correspond to an input to the second pupil relay sub-system 108. In this regard, the relayed pupil plane 104 may correspond to a relayed version of the input pupil plane 102. Accordingly, the input pupil plane 102, the intermediate pupil plane 118 and the relayed pupil plane 104 may correspond to conjugate pupil planes.

In another embodiment, the pupil relay 100 provides a series of conjugate field planes reciprocal to the pupil planes. In this regard, the pupil relay 100 may relay one or more field planes as well as one or more pupil planes. For example, the first pupil relay sub-system 106 may provide a first field plane 120 reciprocal to the input pupil plane 102. Accordingly, light from the input pupil plane 102 is focused to different locations of the first field plane 120 according to the angle at which it emanates from the input pupil plane 102.

In one instance, as illustrated in FIG. 1, a first set of optical rays 122 emanating from any location of the input pupil plane 102 at a first angle may be focused to a first point 124 in the first field plane 120. Similarly, a second set of optical rays 126 emanating from any location of the input pupil plane 102 at a second angle may be focused to a second point 128 in the first field plane 120.

Further, the first set of optical rays 122 emanating from the first point 124 of the first field plane 120 and continuing through the first pupil relay sub-system 106 may be recollimated by the second reflective optical element 112 such that the first set of optical rays 122 are parallel at the intermediate pupil plane 118. Similarly, the second set of optical rays 126 emanating from the second point 128 of the first field plane 120 may be recollimated by the second reflective optical element 112 such that the second set of optical rays 126 are parallel at the intermediate pupil plane 118.

In another instance, as illustrated in FIG. 1, the second pupil relay sub-system 108 may provide a second field plane 130 reciprocal to the intermediate pupil plane 118. In this regard, the input pupil plane 102, the intermediate pupil plane 118, and the input pupil plane 102 may be conjugate pupil planes, while the first field plane 120 and the second field plane 130 may be conjugate field planes.

It may be the case that certain optical elements may introduce aberrations into the wavefront of light propagating through the pupil relay 100. For example, one or more surfaces of an optical element may deviate from an intended surface profile. Manufacturing processes associated with the fabrication of an optical element may introduce irregularities such as, but not limited to, surface roughness, undulations, pits, polishing defects, material defects, or errors of the intended surface profile. By way of another example, as shown in FIG. 1, reflective optical elements (e.g. any of the first reflective optical element 110, the second reflective optical element 112, the third reflective optical element 114, the fourth reflective optical element 116, or the like) may be oriented in an obscuration-free configuration. In this regard, the reflective optical elements may be tilted with respect to each other and/or the input pupil plane 102 such that light may propagate through the pupil relay 100 without being obscured by any of the reflective optical elements.

Optical elements of the pupil relay 100 (e.g. any of the first reflective optical element 110, the second reflective optical element 112, the third reflective optical element 114, the fourth reflective optical element 116, or the like) may include, but are not required to include, at least one spherical reflective optical element. As previously noted herein, even spherical optical elements manufactured with tight tolerances may still introduce aberrations based on orientation within the pupil relay 100. For example, a spherical optical element manufactured within tight tolerances oriented in a tilted configuration (e.g. to eliminate obscurations, or the like) may introduce aberrations such as, but not limited to, astigmatism or coma to a wavefront of incident light.

In another embodiment, aberrations induced by some optical elements (e.g. spherical optical elements) of the pupil relay 100 are compensated for by one or more additional optical elements within the pupil relay 100. For example, aberrations induced by the first reflective optical element 110 may be compensated by any combination of the second reflective optical element 112, the third reflective optical element 114, or the fourth reflective optical element 116. Similarly, aberrations induced by the second reflective optical element 112 may be compensated by any combination of the third reflective optical element 114 or the fourth reflective optical element 116. By way of another example, aberrations induced by a first combination of optical elements may be compensated by one or more additional optical elements. In one instance, aberrations associated with the first pupil relay sub-system 106 may be compensated by the second pupil relay sub-system 108.

In some embodiments, one or more optical elements of the pupil relay 100 are utilized in an "F-F" configuration. In this regard, pupil planes and field planes may be physically separated from an optical element of the pupil relay 100 by a focal length, F, of the optical element. In this regard, the field plane and the pupil plane are separated by an optical distance of twice the focal length, F.

In one embodiment, as illustrated in FIG. 1, the first reflective optical element 110 and the second reflective optical element 112 of the first pupil relay sub-system 106 are each utilized in an "F-F" configuration. In this regard, the first reflective optical element 110 and the second reflective optical element 112 may be configured in a "4-F" configuration such that the first reflective optical element 110 and the second reflective optical element 112 are separated by the sum of their respective focal lengths. Further, the input pupil plane 102 and the intermediate pupil plane 118 may be separated by an optical distance (e.g. a distance traveled by a light ray incident on the optical element) of twice the sum of the respective focal lengths.

In another embodiment, as illustrated in FIG. 1, third reflective optical element 114 and the fourth reflective optical element 116 of the second pupil relay sub-system 108 are utilized in an "F-F" configuration. In this regard, each of the input pupil plane 102, the first field plane 120, the intermediate pupil plane 118, the second field plane 130, and the relayed pupil plane 104 may be physically separated from optical elements 110-116 of the pupil relay 100. It is noted herein that physically separating field planes and/or pupil planes may reduce undesired artifacts associated with relaying field and/or pupil planes. For example, optical elements physically located on or near field and/or pupil planes may introduce undesired artifacts that may degrade system performance.

In another embodiment, the exit pupil of one relay sub-system is aligned to the entrance pupil of a subsequent relay sub-system. For example, the entrance pupil of the second pupil relay sub-system 108 may coincide with the exit pupil of the first pupil relay sub-system 106. Further, an entrance pupil of the first pupil relay sub-system 106 may correspond to an entrance pupil of the entire pupil relay 100. In this regard, illumination entering the entrance pupil of the pupil relay 100 may propagate through each pupil relay sub-system with minimal loss.

It is further noted herein that the pupil relay 100 may include any number of relay sub-systems suitable for providing an aberration-corrected relayed pupil plane. For example, the pupil relay 100 may include a single pupil relay in which one or more optical components are oriented to compensate for aberrations. By way of another example, the pupil relay 100 may include three or more relay sub-systems to produce an aberration-corrected relayed pupil plane.

Figure 2A:
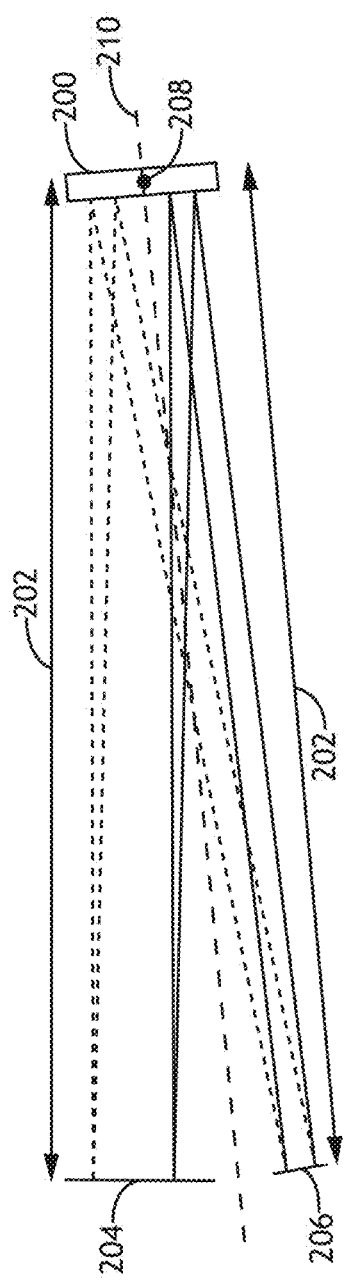
FIG. 2A is a conceptual view of a spherical off-axis reflective optical element, in accordance with one or more embodiments of the present disclosure.
Figure 2B:
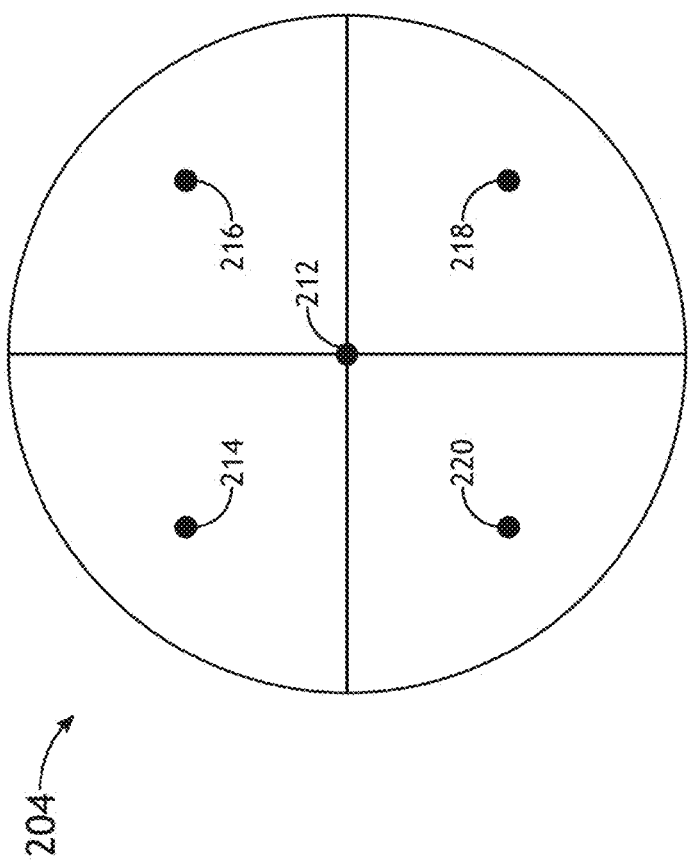
FIG. 2B is a conceptual view of a field plane, in accordance with one or more embodiments of the present disclosure.
Figure 2C:
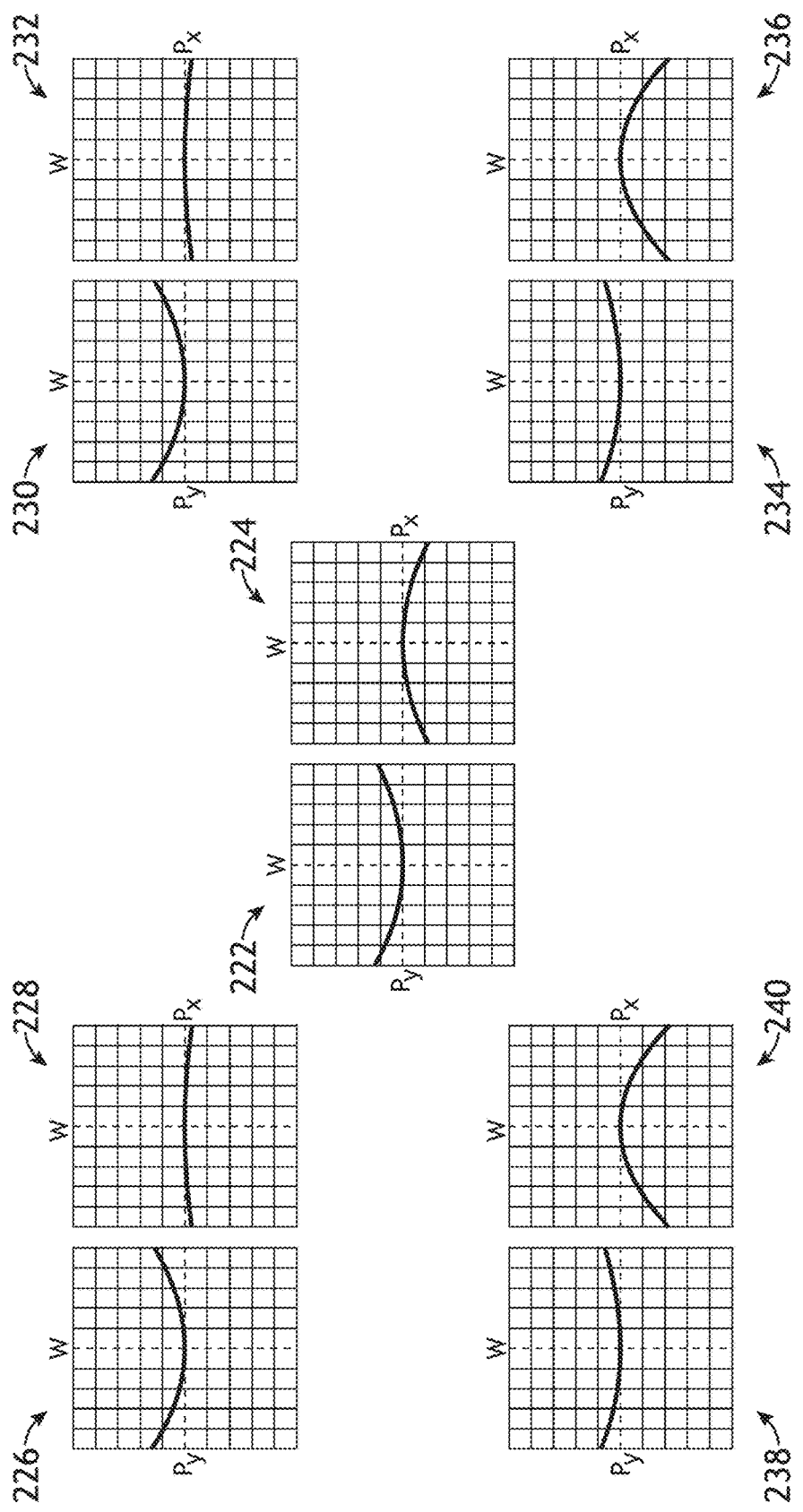
FIG. 2C is a series of wavefront aberration plots associated with rays emanating from points of the field plane of FIG. 2B, in accordance with one or more embodiments of the present disclosure.

FIGS. 2A through 2C illustrate aberrations associated with a single spherical off-axis reflective optical element. FIG. 2A is a conceptual ray diagram of a spherical off-axis reflective optical element, in accordance with one or more embodiments of the present disclosure. In one embodiment, a spherical reflective optical element 200 having a focal length 202 is oriented in an "F-F" configuration. For example, a field plane 204 and a pupil plane 206 are each located one focal length 202 from the reflective optical element 200. In another embodiment, the reflective optical element 200 is tilted in an off-axis configuration. For example, reflective optical element 200 may be tilted about a tilt-axis 208 (e.g. the Y axis in FIG. 2A). In this regard, the reflective optical element 200 may be rotated about the tilt axis such that an optical axis 210 of the reflective optical element 200 (e.g. an axis of rotational symmetry of the reflective optical element 200, or the like) is not orthogonal to either the field plane 204 or the pupil plane 206. Accordingly, the reflective optical element 200 may be tilted with respect to illumination from the field plane 204. Further, the field plane 204 and the pupil plane 206 may be physically separated.

FIGS. 2B and 2C illustrate wavefront aberrations associated with the reflective optical element 200 of FIG. 2A. FIG. 2B is a conceptual view of the field plane 204, in accordance with one or more embodiments of the present disclosure. For example, the field plane 204 may include a center point 212, an upper-left quadrant point 214, an upper-right quadrant point 216, a lower-right quadrant point 218, and a lower-left quadrant point 220. FIG. 2C is a series of wavefront aberration plots associated with rays emanating from points 212-220 of the field plane 204, in accordance with one or more embodiments of the present disclosure.

It is noted herein that light rays may propagate normal to a wavefront surface such that the wavefront may describe the directionality of rays having a common phase. For example, a planar wavefront may describe collimated light with parallel rays, a spherically diverging wavefront may describe rays emanating from a single point at the center of the sphere, a spherically converging wavefront may describe rays converging to a point at the center of the sphere, and the like.

A wavefront aberration plot may provide a deviation of a wavefront with respect to a reference wavefront. For example, an optical system configured to generate a relayed image plane may focus light rays emanating from each point in an object plane to a corresponding point in the image plane. Accordingly, a reference wavefront of an image-forming optical system may typically include a converging spherical surface centered at the intersection of the image plane and the optical axis of the optical system. Similarly, a reference wavefront of an afocal optical system (e.g. a pupil relay system in which incident and/or exiting light is collimated, or the like) may be a plane normal to the optical axis. In this regard, a wavefront aberration plot may describe deviations from the planar reference wavefront associated with rays from a particular point of an object plane.

It is noted herein that astigmatism may be, but is not required to be, a dominant aberration associated with a concave reflective optical element in an off-axis "F-F" configuration as illustrated in FIG. 2A. In one embodiment, wavefront aberration plot 222 and wavefront aberration plot 224 illustrate wavefront aberrations along the $P_Y$ and $P_X$ directions, respectively, of rays emanating from center point 212, in the field plane 204. In another embodiment, wavefront aberration plot 226 and wavefront aberration plot 228 illustrate wavefront aberrations along the $P_Y$ and $P_X$ directions, respectively, of rays emanating from upper-left quadrant point 214. In another embodiment, wavefront aberration plot 230 and wavefront aberration plot 232 illustrate wavefront aberrations along the $P_Y$ and $P_X$ directions, respectively, of rays emanating from upper-right quadrant point 216. In another embodiment, wavefront aberration plot 234 and wavefront aberration plot 236 illustrate wavefront aberrations along the $P_Y$ and $P_X$ directions, respectively, of rays emanating from lower-right quadrant point 218. In another embodiment, wavefront aberration plot 238 and wavefront aberration plot 240 illustrate wavefront aberrations along the $P_Y$ and $P_X$ directions, respectively, of rays emanating from lower-left quadrant point 220.

In this regard, as illustrated in FIG. 2C, rays associated with center point 212 as well as points 214-220 exhibit astigmatism. For example, rays associated with center point 212 as well as points 214-220 may exhibit a saddle-shaped wavefront aberration that may be attributed to astigmatism in which the wavefront aberrations along the $P_Y$ and $P_X$ directions have opposite signs. For instance, wavefront aberration plot 222 may indicate positive wavefront curvature along the $P_Y$ direction and wavefront aberration plot 224 may indicate negative wavefront curvature along the $P_X$ direction.

Further, as seen in FIG. 2C, the magnitude of the wavefront aberrations along the $P_Y$ and $P_X$ directions may vary for rays emanating from different locations within the field plane 204. For example, rays emanating from the upper-left quadrant point 214 may exhibit a larger magnitude of aberrated wavefront curvature along the $P_Y$ direction than along the $P_X$ direction (e.g. see wavefront aberration plots 226 and 228), while rays emanating from the lower-right quadrant point 218 may exhibit a larger magnitude of aberrated wavefront curvature along the $P_X$ direction than along the $P_Y$ direction (e.g. see wavefront aberration plots 234 and 236).

In some embodiments, off-axis aberrations introduced by one optical element may be at least partially compensated for by one or more subsequent optical elements. For example, a first off-axis spherical optical element rotated about a first tilt axis with respect to an input optical field may introduce off-axis aberrations to light rays emanating from the input optical field. Further, a second off-axis spherical optical element rotated about a second tilt axis orthogonal to the first tilt axis may compensate for at least a portion of the off-axis aberrations introduced by the first off-axis spherical optical element. Additional off-axis spherical optical elements may provide increased aberration-correction. FIGS. 3A through 3G illustrate orientations of spherical optical elements such that aberrations (e.g. astigmatism, coma, or the like) introduced by one or more spherical optical elements may be compensated by subsequent spherical optical elements.

Figure 3A:
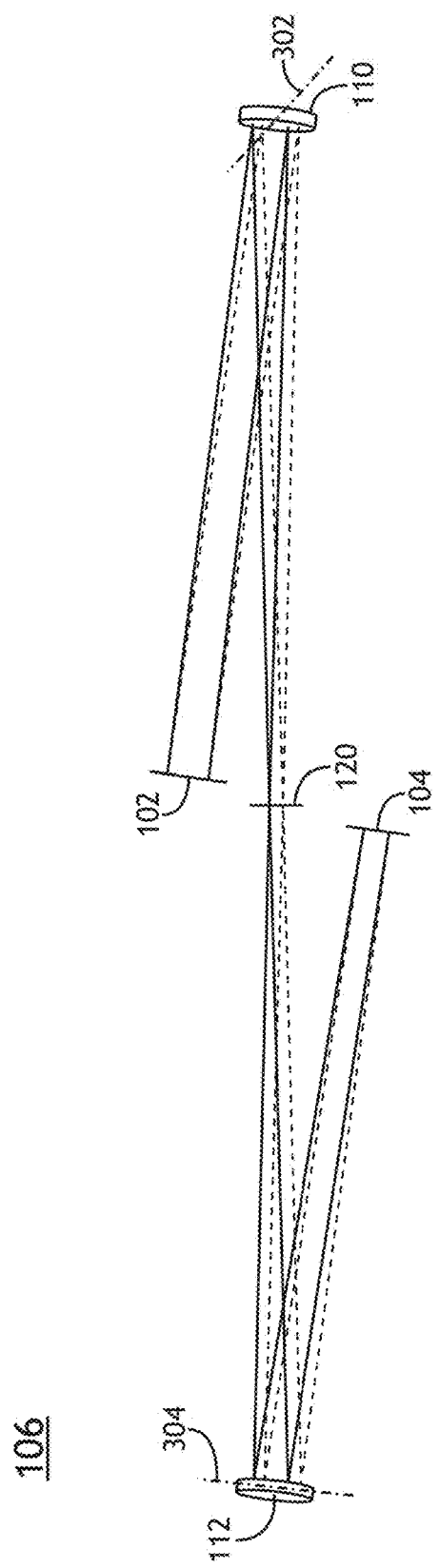
FIG. 3A is a perspective view of a pupil relay system including reflective spherical optical elements oriented to provide aberration correction for at least a central portion of the relayed pupil field, in accordance with one or more embodiments of the present disclosure.

FIG. 3A is a perspective view of a pupil relay system including reflective spherical optical elements oriented to provide aberration correction for at least a central portion of the relayed pupil field, in accordance with one or more embodiments of the present disclosure. For example, the pupil relay system illustrated in FIG. 3A may correspond to, but is not required to correspond to, the first pupil relay sub-system 106 of the pupil relay 100.

In one embodiment, the first reflective optical element 110 is rotated about a first tilt axis 302 with respect to the input pupil plane 102 in an off-axis configuration. Accordingly, the optical axis of the first reflective optical element 110 is not orthogonal to the input pupil plane 102 and may introduce aberrations (e.g. astigmatism, coma, or the like) to light from the input pupil plane 102. For example, the first reflective optical element 110 may introduce astigmatism to wavefronts of light from the input pupil plane 102 incident on the first reflective optical element 110 at off-axis angles. In another embodiment, the second reflective optical element 112 is rotated about a second tilt axis 304 with respect to the first field plane 120. For example, the second tilt axis 304 may be oriented of FIG. 3A such that it is orthogonal to the first tilt axis 302 (e.g. such that the second tilt axis 304 may be rotated 90 degrees with respect to the first tilt axis 302). As will be described in detail below, aberrations induced by the first reflective optical element 110 may be at least partially corrected by the second reflective optical element 112 or one or more additional spherical optical elements.

Figure 3B:
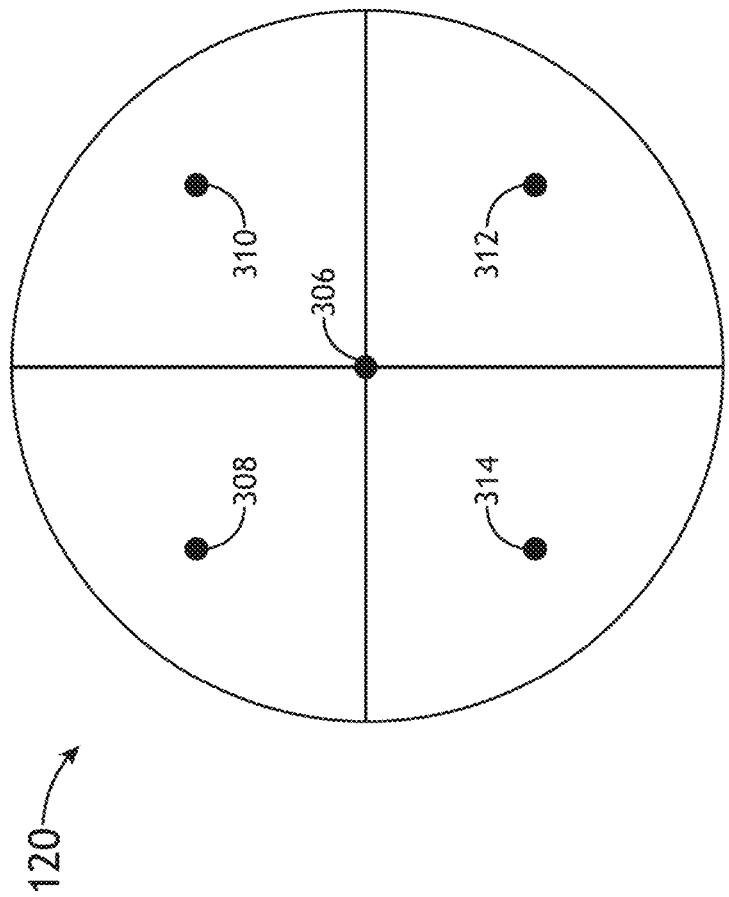
FIG. 3B is a conceptual view of a field plane, in accordance with one or more embodiments of the present disclosure.
Figure 3B:
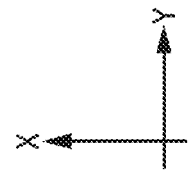
Figure 3C:
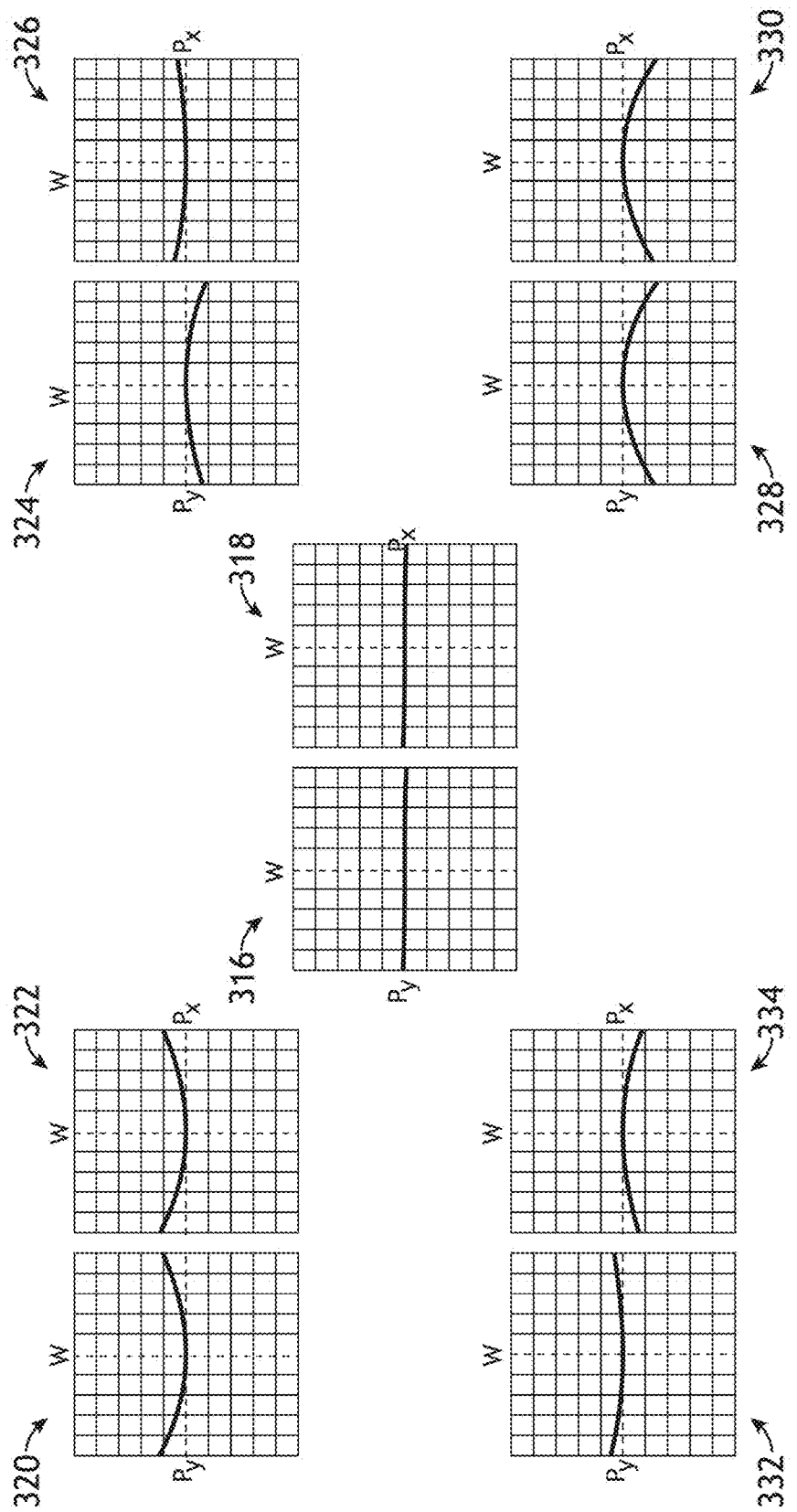
FIG. 3C is a series of wavefront aberration plots associated with rays propagating through points of the field plane of FIG. 3B, in accordance with one or more embodiments of the present disclosure.

FIG. 3B is a conceptual view of the first field plane 120, in accordance with one or more embodiments of the present disclosure. For example, the first field plane 120 may include a center point 306, an upper-left quadrant point 308, an upper-right quadrant point 310, a lower-right quadrant point 312, and a lower-left quadrant point 314 that correspond to images of corresponding points of an object plane (not shown). It is noted that rays propagating through points 306-314 represent rays propagating through the input pupil plane 102 at different angles. FIG. 3C is a series of wavefront aberration plots associated with rays propagating through points 306-314 of the first field plane 120, in accordance with one or more embodiments of the present disclosure. In one embodiment, wavefront aberration plot 316 and wavefront aberration plot 318 illustrate wavefront aberrations along the $P_Y$ and $P_X$ directions, respectively, of rays emanating from the center point 306 of the input pupil plane 102. In another embodiment, wavefront aberration plots 320-322 illustrate wavefront aberrations along the $P_Y$ and $P_X$ directions, respectively, of rays emanating from upper-left quadrant point 308. In another embodiment, wavefront aberration plots 324-326 illustrate wavefront aberrations along the $P_Y$ and $P_X$ directions, respectively, of rays emanating from upper-right quadrant point 310. In another embodiment, wavefront aberration plots 328-330 illustrate wavefront aberrations along the $P_Y$ and $P_X$ directions, respectively, of rays emanating from lower-right quadrant point 312. In another embodiment, wavefront aberration plots 332-334 illustrate wavefront aberrations along the $P_Y$ and $P_X$ directions, respectively, of rays emanating from lower-left quadrant point 314.

In one embodiment, light associated with at least part of the input pupil plane 102 may exhibit substantially no aberrations such that at least part of the relayed pupil plane 104 may be aberration-corrected. For example, as indicated by wavefront aberration plots 316-318, a wavefront associated with light propagating through the center point 306 of the first field plane 120 exhibits substantially no aberrations at the exit pupil of the second reflective optical element 112. In this regard, a portion of the relayed pupil plane 104 associated with a central point of an object plane (not shown) may be aberration corrected. However, it may be the case that light associated with additional portions of the input pupil plane 102 may exhibit aberrations after propagating through the first pupil relay sub-system 106. For example, wavefront aberration plots 320-334 indicate residual wavefront aberration for light associated with points 344-358 of the input pupil plane 102. Additionally, as seen in wavefront aberration plots 320-334, characteristics of the wavefront aberrations (e.g. magnitude, direction, symmetry, or the like) may vary for light from various locations in the input pupil plane 102. In some embodiments, such residual wavefront aberrations may be at least partially compensated by one or more additional spherical optical elements.

Figure 3D:
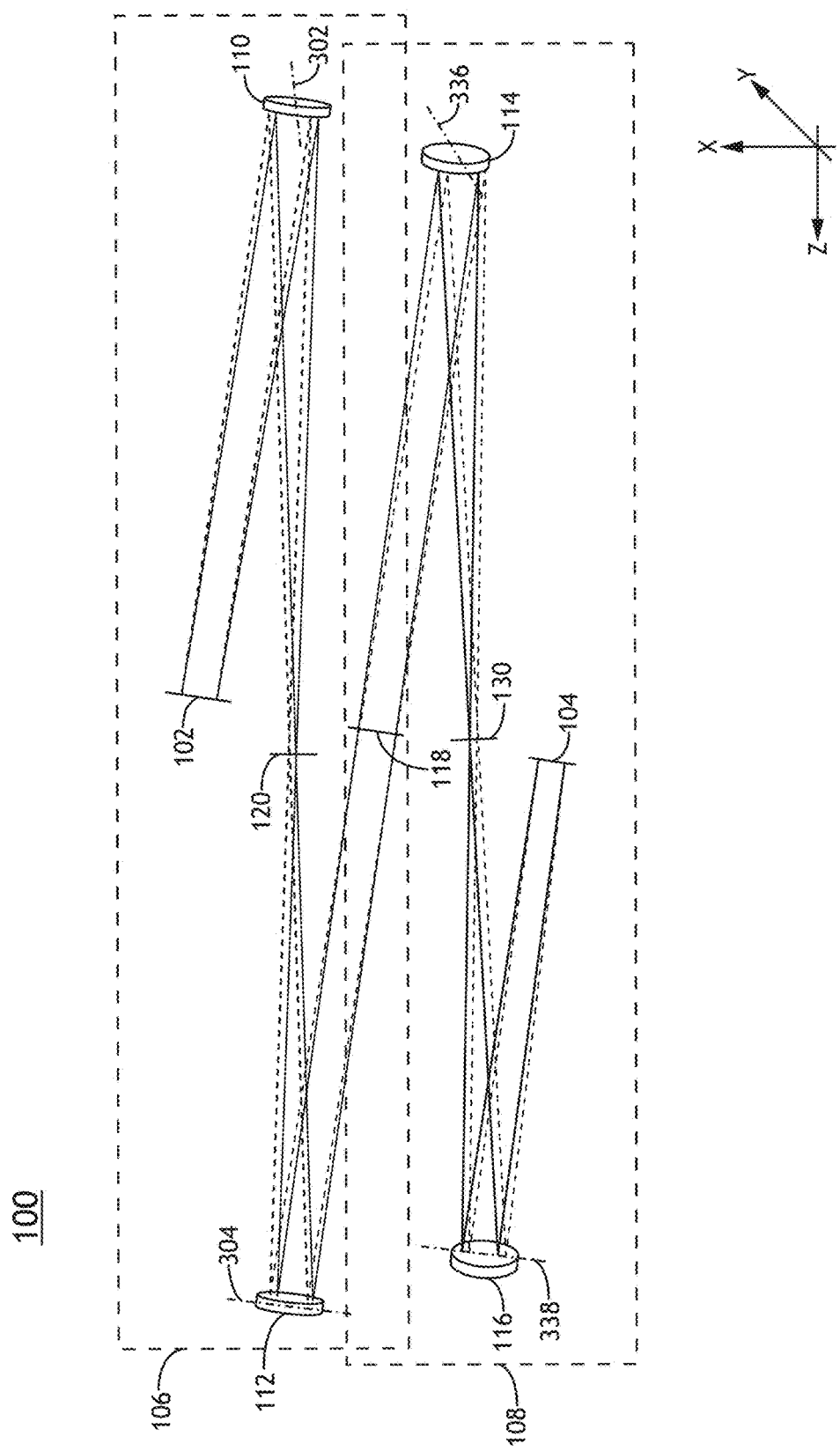
FIG. 3D is a perspective view of a pupil relay including two cascaded optical relay sub-systems with spherical optical elements oriented to produce an aberration-corrected relay plane for the full field of rays propagating through the field plane of FIG. 3B, in accordance with one or more embodiments of the present disclosure.

FIG. 3D is a perspective view of the pupil relay 100 including two cascaded pupil relay sub-systems with spherical optical elements oriented to produce an aberration-corrected relay plane for the full field of rays propagating through the first field plane 120, in accordance with one or more embodiments of the present disclosure. In one embodiment, the first pupil relay sub-system 106 relays the input pupil plane 102 to the intermediate pupil plane 118. For example, the tilt axes of the first reflective optical element 110 and the second reflective optical element 112 may be orthogonal to each other (e.g. as illustrated in FIG. 3A) to partially correct for aberrations (e.g. associated with rays propagating through the center of the first field plane 120). In this regard, the first reflective optical element 110 may be rotated about the first tilt axis 302 such that the first reflective optical element 110 is tilted with respect to the input pupil plane 102. The second reflective optical element 112 may be rotated about the second tilt axis 304, which is orthogonal to the first tilt axis 302, such that the second reflective optical element 112 is tilted with respect to the first reflective optical element 110. Further, the second reflective optical element 112 may be tilted with respect to the first field plane 120.

In another embodiment, the second pupil relay sub-system 108 may be a rotated version of the first pupil relay sub-system 106. In this regard, the second pupil relay sub-system 108 may relay the intermediate pupil plane 118 to provide an aberration-corrected relayed pupil plane 104 (e.g. rays propagating through all portions of the first field plane 120 may be corrected for aberrations). For example, the second pupil relay sub-system 108 may be rotated with respect to the first pupil relay sub-system 106 around an optical axis common to both the first pupil relay sub-system 106 and the second pupil relay sub-system 108. In one instance, the second pupil relay sub-system 108 may be rotated with respect to the first pupil relay sub-system 106 by 90 degrees about the common optical axis (e.g. in an orthogonal configuration) such that the second pupil relay sub-system 108 compensates for the residual aberrations associated with light passing through outer portions of the first field plane 120 induced by the first pupil relay sub-system 106.

Accordingly, the rotation axes of the third reflective optical element 114 and the fourth reflective optical element 116 may be orthogonal to each other. In this regard, the third reflective optical element 114 may be rotated about a third tilt axis 336. The fourth reflective optical element 116 may be rotated about a fourth tilt axis 338, which is orthogonal to the third tilt axis 336, such that the fourth reflective optical element 116 is tilted with respect to the third reflective optical element 114. Further, the fourth reflective optical element 116 may be tilted with respect to the second field plane 130.

In one embodiment, as illustrated in FIG. 3D, the third tilt axis 336 is perpendicular to the second tilt axis 304 such that the third reflective optical element 114 is tilted with respect to the second reflective optical element 112. Further, the third reflective optical element 114 may be tilted with respect to the intermediate pupil plane 118. In this regard, the first tilt axis 302 may be parallel to the third tilt axis 336, the second tilt axis 304 may be parallel to the fourth tilt axis 338, and the second tilt axis 304 may be perpendicular to the third tilt axis 336. In another embodiment, the third tilt axis 336 is parallel to the second tilt axis 304. In this regard, the first tilt axis 302 may be parallel to the fourth tilt axis 338.

Further, the entrance pupil of the second pupil relay sub-system 108 may be aligned with the exit pupil of the first pupil relay sub-system 106 such that light exiting the first pupil relay sub-system 106 may be collected by the second pupil relay sub-system 108.

FIG. 3E is a series of wavefront aberration plots associated with rays propagating through the first pupil relay sub-system 106 and the second pupil relay sub-system 108 of FIG. 3D and also passing through points 306-314 of the first field plane 120 (see FIG. 3B), in accordance with one or more embodiments of the present disclosure. In one embodiment, wavefront aberration plots 340-342 illustrate wavefront aberrations along the $P_Y$ and $P_X$ directions, respectively, of rays passing through center point 306, in the input pupil plane 102. In another embodiment, wavefront aberration plots 344-346 illustrate wavefront aberrations along the $P_Y$ and $P_X$ directions, respectively, of rays passing through upper-left quadrant point 308. In another embodiment, wavefront aberration plots 348-350 illustrate wavefront aberrations along the $P_Y$ and $P_X$ directions, respectively, of rays passing through upper-right quadrant point 310. In another embodiment, wavefront aberration plots 352-354 illustrate wavefront aberrations along the $P_Y$ and $P_X$ directions, respectively, of rays passing through lower-right quadrant point 312. In another embodiment, wavefront aberration plots 356-358 illustrate wavefront aberrations along the $P_Y$ and $P_X$ directions, respectively, of rays passing through lower-left quadrant point 314.

A comparison of wavefront aberration plots 340-358 corresponding to FIG. 3D compared to wavefront aberration plots 316-334 corresponding to FIG. 3A illustrates that aberrations across the field of view induced by the optical elements of the first pupil relay sub-system 106 may be at least partially corrected by optical elements of the second pupil relay sub-system 108 for light passing through the pupil relay 100.

It is to be understood that aberrations need not be fully corrected for rays passing through points of the first field plane 120 (e.g. propagating through the input pupil plane 102 at all angles). Rather, the aberrations may be corrected to within a specified tolerance associated with the pupil relay 100. For example, it may be the case that characteristics of the wavefront (e.g. magnitude, direction, symmetry, or the like) may vary for rays passing through input pupil plane 102 at different angles. In this regard, wavefront aberration plots 340-342 of FIG. 3E may illustrate nearly full compensation of wavefront aberrations for light passing through the center point 306 of the first field plane 120, while wavefront aberration plots 344-358 may illustrate some residual aberration. Further, the residual aberration of wavefront aberration plots 344-358 associated with FIG. 3D may be substantially smaller than the residual aberration of wavefront aberration plots 320-334 associated with FIG. 3A. In one embodiment, the residual aberration is within the tolerance of the pupil relay 100 such that the relayed pupil plane 104 may be considered to be aberration-corrected. In another embodiment, the pupil relay 100 include one or more additional pupil relay sub-systems to further compensate for aberrations induced by the first pupil relay sub-system 106 and/or the second pupil relay sub-system 108.

In another embodiment, the pupil relay 100 may include one or more additional elements to compensate for additional residual aberrations. For example, the pupil relay 100 may include, but is not required to include, one or more aspherical optical elements designed to compensate for aberrations from any other optical elements of the pupil relay 100. In one instance, any of the first reflective optical element 110, the second reflective optical element 112, the third reflective optical element 114, or the fourth reflective optical element 116 may include an aspherical optical element. In another instance, the pupil relay 100 may include one or more additional aberration-correcting elements (e.g. an additional aspherical optical element, a diffractive optical element designed to modify the wavefronts of light within the pupil relay 100, or the like).

It is noted herein that the depictions of specific embodiments of the pupil relay 100 in FIGS. 3A through 3E are provided for illustrative purposes and should not be interpreted as limiting the present disclosure. In a general sense, the pupil relay 100 may include any number of optical elements oriented in any configuration suitable for providing an aberration-corrected relay plane at the relayed pupil plane 104. For example, the tilt axes of optical elements of the pupil relay 100 may be oriented in any configuration suitable for providing an aberration-corrected relayed pupil plane 104. In one embodiment, the magnitude of the rotation of optical elements around tilt axes is constant for all optical elements within the pupil relay 100. Additionally, it may be the case that alternative orientations of the tilt axes (e.g. non-orthogonal configurations) may at least partially compensate for additional aberrations (e.g. coma, or the like) alone or in combination with astigmatism as described herein. In another embodiment, the magnitude of the rotation of optical elements around tilt axes is not constant for all optical elements within the pupil relay 100.

Figure 3F:
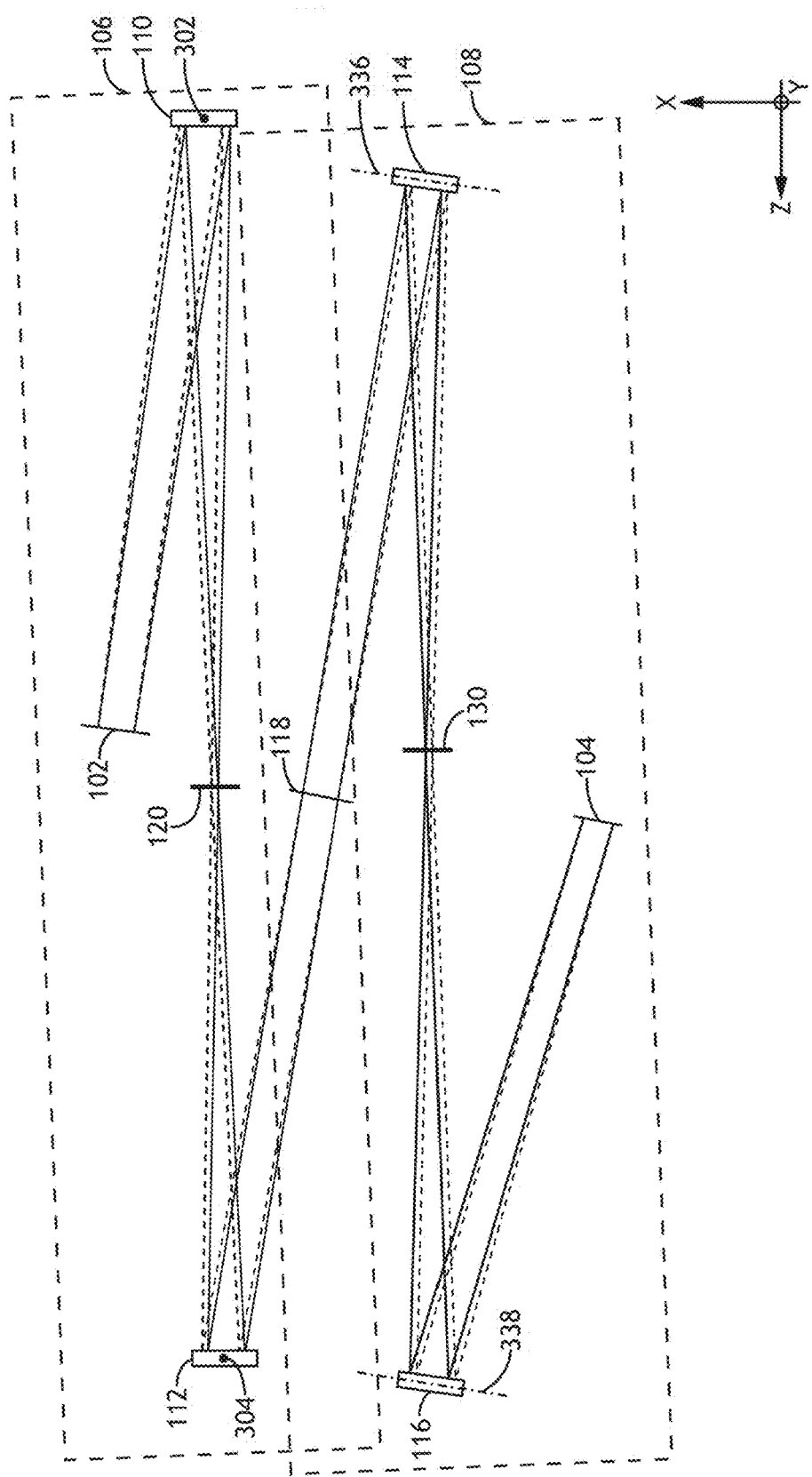
FIG. 3F is a conceptual view of a pupil relay including two orthogonally-positioned cascaded optical relay sub-systems in which optical elements of each relay sub-system are tilted along a common plane, in accordance with one or more embodiments of the present disclosure.

FIG. 3F is a conceptual view of pupil relay 100 including two orthogonally-positioned cascaded pupil relay sub-systems in which optical elements of each relay sub-system are tilted along a common plane, in accordance with one or more embodiments of the present disclosure. In this regard, wavefront aberrations may not be fully corrected any rays at the intermediate pupil plane 118, but may be compensated for rays at the relayed pupil plane 104.

In one embodiment, the first tilt axis 302 of the first reflective optical element 110 and the second tilt axis 304 of the second reflective optical element 112 are parallel. For example, as illustrated in FIG. 3F, the first tilt axis 302 and the second tilt axis 304 may be oriented along the Y axis. In another embodiment, the third tilt axis 336 of the third reflective optical element 114 and the fourth tilt axis 338 of the fourth reflective optical element 116 are parallel to each other and perpendicular to the first tilt axis 302 and the second tilt axis 304. For example, as illustrated in FIG. 3F, the third tilt axis 336 and the fourth tilt axis 338 may be oriented along the X-Z plane, perpendicular to the Y axis.

Figure 3G:
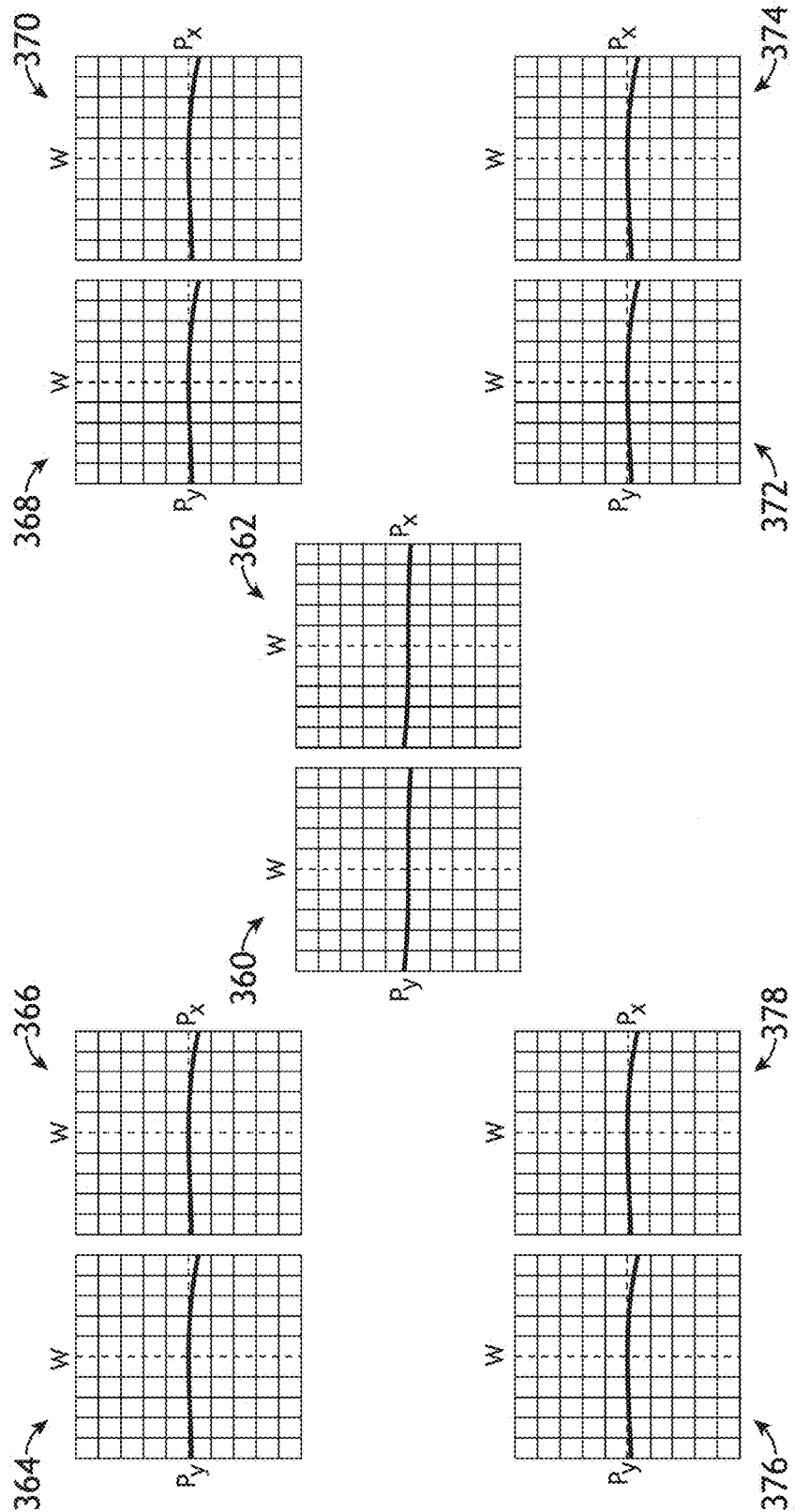
FIG. 3G is a series of wavefront aberration plots associated with rays propagating through a first pupil relay sub-system and a second pupil relay sub-system, and also passing through points of the field plane of FIG. 3B, in accordance with one or more embodiments of the present disclosure.

FIG. 3G is a series of wavefront aberration plots associated with rays propagating through the first pupil relay sub-system 106 and the second pupil relay sub-system 108 of FIG. 3F and also passing through points 306-314 of the first field plane 120 of FIG. 3B, in accordance with one or more embodiments of the present disclosure. In one embodiment, wavefront aberration plot 360 and wavefront aberration plot 362 illustrate wavefront aberrations along the $P_Y$ and $P_X$ directions, respectively, of rays passing through center point 306, in the input pupil plane 102. In another embodiment, wavefront aberration plot 364 and wavefront aberration plot 366 illustrate wavefront aberrations along the $P_Y$ and $P_X$ directions, respectively, of rays passing through upper-left quadrant point 308. In another embodiment, wavefront aberration plot 368 and wavefront aberration plot 370 illustrate wavefront aberrations along the $P_Y$ and $P_X$ directions, respectively, of rays passing through upper-right quadrant point 310. In another embodiment, wavefront aberration plot 372 and wavefront aberration plot 374 illustrate wavefront aberrations along the $P_Y$ and $P_X$ directions, respectively, of rays passing through lower-right quadrant point 312. In another embodiment, wavefront aberration plot 376 and wavefront aberration plot 378 illustrate wavefront aberrations along the $P_Y$ and $P_X$ directions, respectively, of rays passing through lower-left quadrant point 314.

For example, as seen in wavefront aberration plots 360-378, aberrations induced by the optical elements of the first pupil relay sub-system 106 may be at least partially corrected by optical elements of the second pupil relay sub-system 108 for all light passing through the pupil relay 100. It is noted herein that the aberration-corrected relay plane at the relayed pupil plane 104 may exhibit some aberration not fully compensated by the orientations of the optical elements within the pupil relay 100. In this regard, as illustrated in FIG. 3G, wavefront aberration plots 360-378 may exhibit additional residual aberration. In one embodiment, any residual aberration is within the tolerance of the pupil relay 100 such that the relay plane in the relayed pupil plane 104 may be considered to be aberration-corrected. In another embodiment, the pupil relay 100 includes one or more additional relay sub-systems to further compensate for aberrations induced by the first pupil relay sub-system 106 and/or the second pupil relay sub-system 108.

Figure 4:
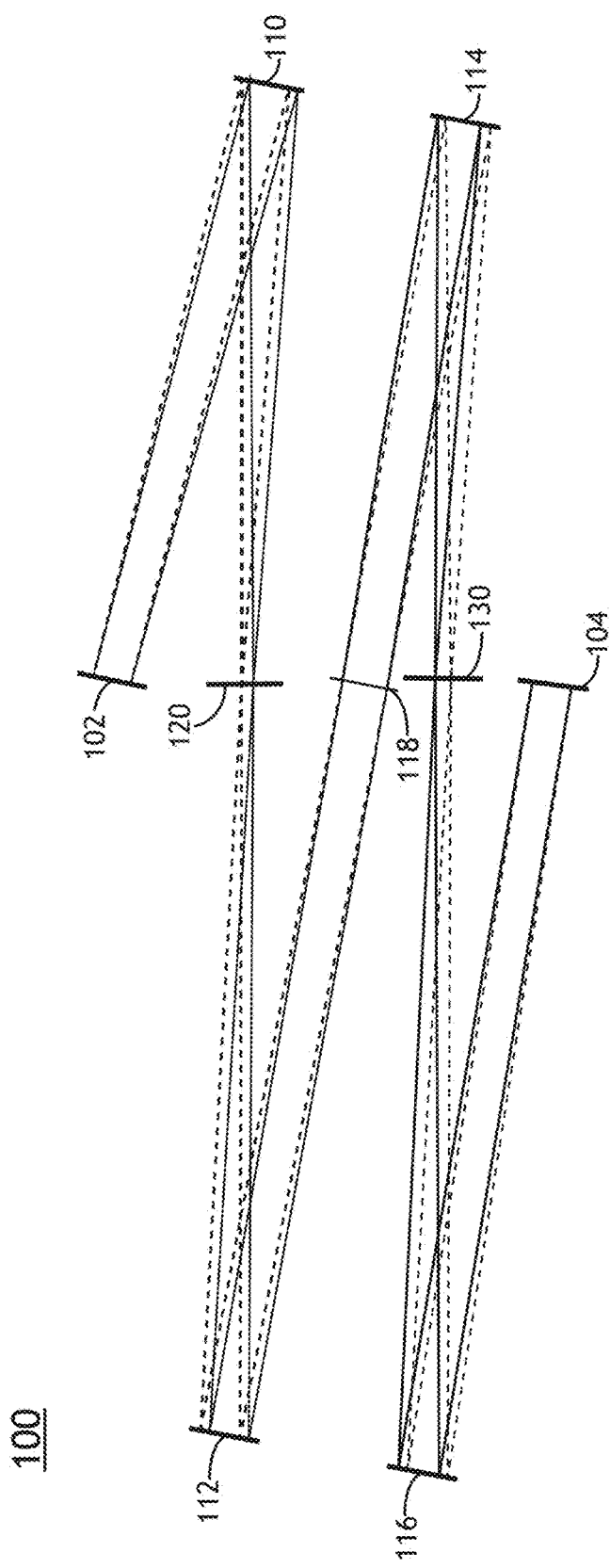
FIG. 4 is a perspective view of a pupil relay system with a non-unity magnification, in accordance with one or more embodiments of the present disclosure.

The pupil relay 100 may provide the relayed pupil plane 104 at any magnification. FIG. 4 is a perspective view of a pupil relay 100 with a non-unity magnification, in accordance with one or more embodiments of the present disclosure. In one embodiment, the first reflective optical element 110 has a focal length, $F_A$, the second reflective optical element 112 has a focal length, $F_B$, the third reflective optical element 114 has a focal length, $F_C$, and the fourth reflective optical element 116 has a focal length, $F_D$.

A magnification of a pupil relay sub-system in an "F-F" configuration (e.g. the first pupil relay sub-system 106, the second pupil relay sub-system 108, or the like) may be related to the ratios of the focal lengths of the optical elements within the relay sub-system. For example, a magnification of the intermediate image at the intermediate pupil plane 118 with respect to the object at the input pupil plane 102 may be described as $F_B/F_A$. As another example, a magnification of the relay plane at the relayed pupil plane 104 with respect to the intermediate image at the intermediate pupil plane 118 may be described as $F_D/F_C$. Further, the total magnification of the pupil relay 100 may be $(F_B F_D)/(F_A F_C)$. By way of another example, the first pupil relay sub-system 106 and the second pupil relay sub-system 108 may have the same focal lengths such that $F_A = F_C$, $F_B = F_D$, and the total magnification of the pupil relay 100 may be $F_B^2/F_A^2$.

Figure 5A:
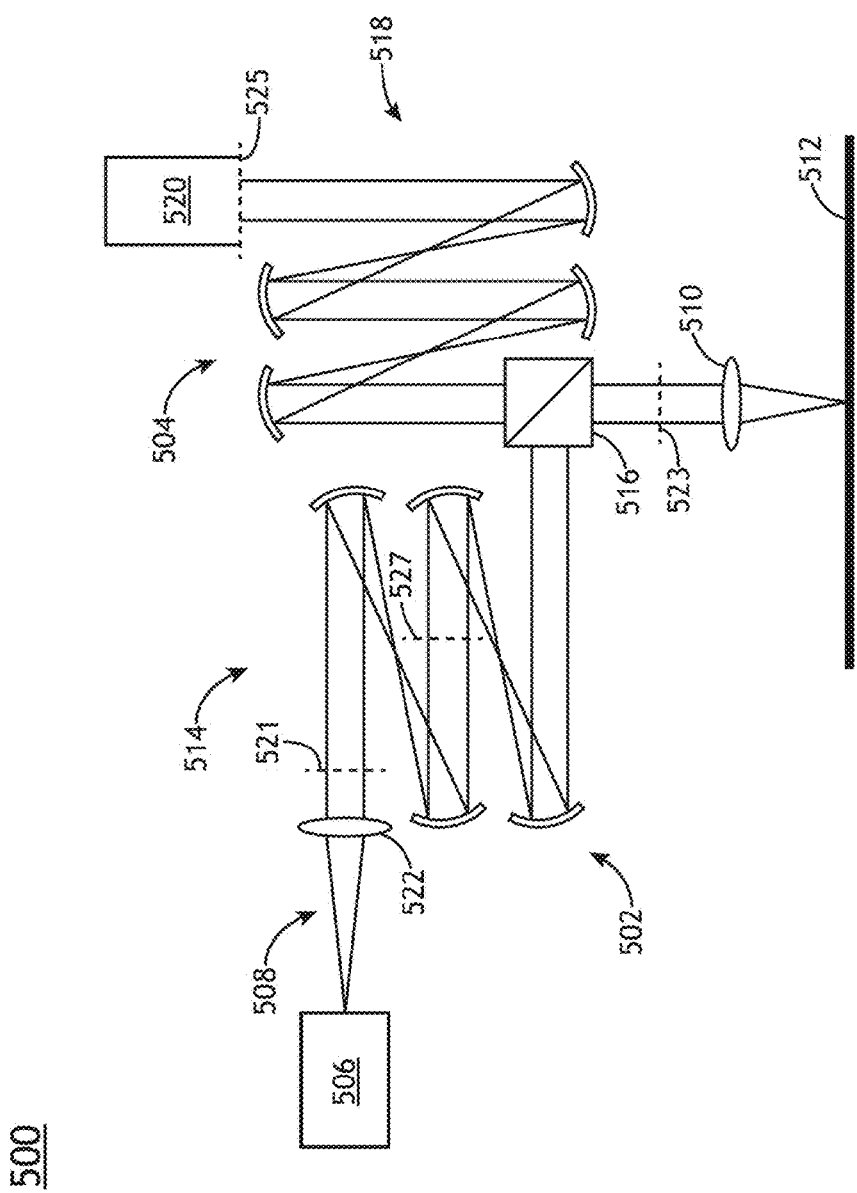
FIG. 5A is a conceptual view of a metrology system including a first optical relay system and a second optical relay system, in accordance with one or more embodiments of the present disclosure.

As previously described, an optical relay described according to the embodiments herein (e.g. pupil relay 100, a field plane relay, or the like) may be utilized as a part of an external optical system. FIG. 5A is a conceptual view of a metrology system 500 (e.g. a microscope, a scatterometry, an angular resolved scatterometer, or the like) including a first optical relay system 502 and a second optical relay system 504, in accordance with one or more embodiments of the present disclosure. For example, the first optical relay system 502 and the second optical relay system 504 may each include instances of pupil relay 100.

In one embodiment, the metrology system 500 includes an illumination source 506 to generate a beam of illumination 508. In another embodiment, the metrology system 500 includes an objective lens 510 configured to direct the beam of illumination 508 to a sample 512. In another embodiment, the metrology system 500 includes one or more optical elements along an illumination pathway 514 to direct the beam of illumination 508 to the sample 512. In another embodiment, the metrology system 500 is configured in epi-mode with a beamsplitter 516 such that the objective lens 510 both directs the beam of illumination 508 to the sample 512 and collects radiation emanating from the sample 512. In another embodiment, the metrology system 500 includes one or more illumination optics along a collection pathway 518 to receive the collected radiation from the sample 512 and direct the collected radiation to a detector 520.

The first optical relay system 502 may provide an optical relay for an illumination arm of the metrology system 500 (e.g. as part of the illumination pathway 514, or the like). In one embodiment, the first optical relay system 502 relays illumination from the illumination source 506 at an illumination plane 521 to an objective relay plane 523 (e.g. the back focal plane of the objective lens 510, or the like). For example, the illumination plane 521 may include a pupil plane (e.g. the back focal plane of an illumination lens 522). In this regard, the metrology system 500 may illuminate the sample 512 with critical illumination. By way of another example, illumination plane 521 may include an image of the illumination source 506 such that the objective lens 510 may provide Köhler illumination of the sample 512.

In another embodiment, the second optical relay system 504 may provide an optical relay for a collection arm of the metrology system 500 (e.g. as part of the collection pathway 518, or the like). For example, the objective lens 510 may direct radiation emanating from the sample to the objective relay plane 523 (e.g. the back focal plane of the objective lens 510, or the like). Further, as illustrated in FIG. 5A, the second optical relay system 504 may relay radiation emanating from the sample 512 at objective relay plane 523 to a detector relay plane 525. For example, as illustrated in FIG. 5A, the detector relay plane may be located at the detector 520. In this regard, the angular distribution of radiation from sample 512 may be captured on the detector 520. By way of another example, although not shown, an additional lens may provide an image of the sample 512 on the detector 520 based on the detector pupil plane 525.

The first optical relay system 502 and the second optical relay system 504 may have any configuration suitable for generating aberration-corrected relay planes. For example, the first optical relay system 502 and/or the second optical relay system 504 may be, but are not required to be, configured to generate an intermediate relay plane 527 that is partially corrected for aberrations (e.g. as illustrated in FIG. 3D) or an intermediate relay plane that is not partially corrected for aberrations (e.g. as illustrated in FIG. 3F).

Figure 5B:
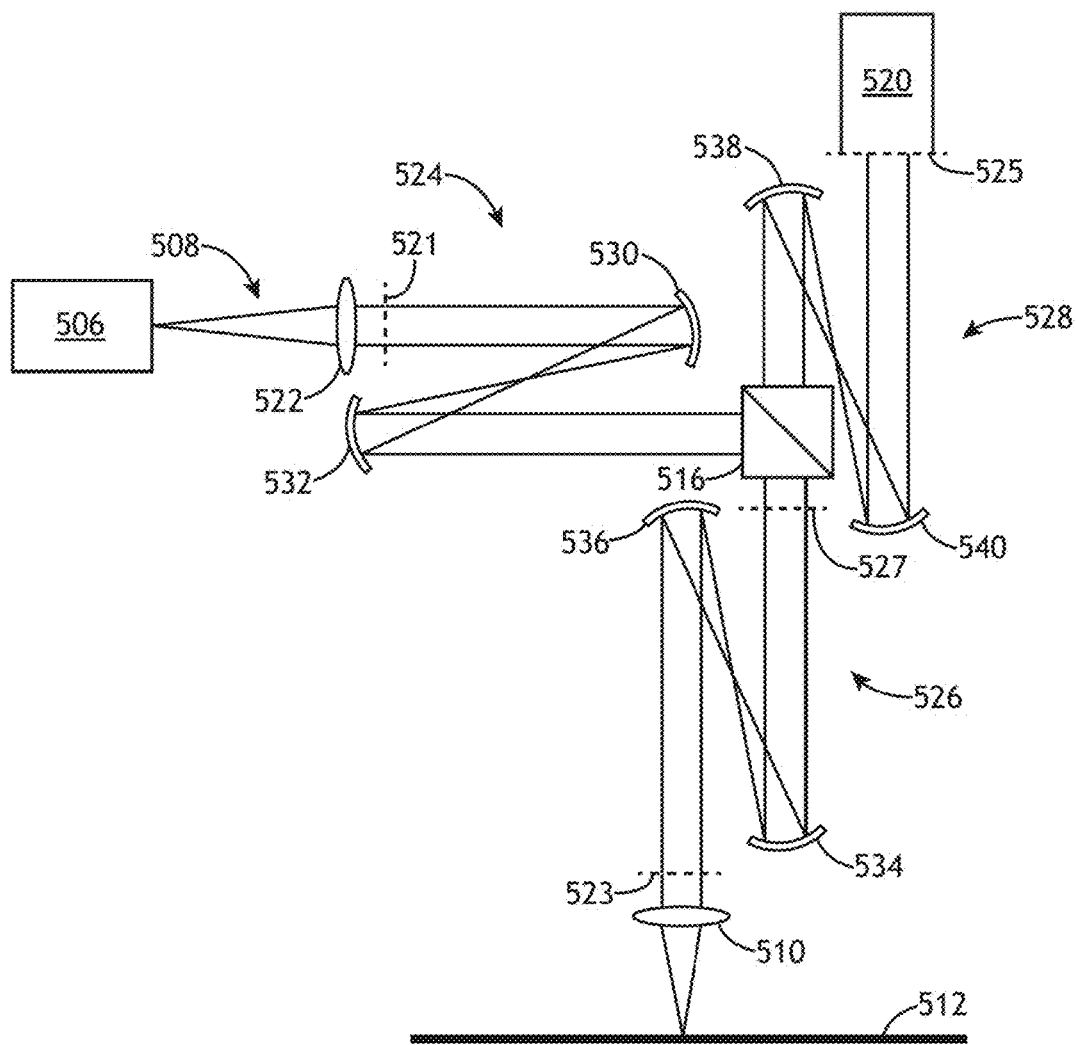
FIG. 5B is a conceptual view of a metrology system including two optical relays in which the two optical relays share an optical relay sub-system, in accordance with one or more embodiments of the present disclosure.

In another embodiment, an optical relay sub-system (e.g. the first pupil relay sub-system 106, the second pupil relay sub-system 108, or the like) may be shared by multiple relay systems. FIG. 5B is a conceptual view of the metrology system 500 including two optical relays in which the two optical relays share an optical relay sub-system, in accordance with one or more embodiments of the present disclosure. In one embodiment, as illustrated in FIG. 5B, the metrology system 500 includes an illumination relay sub-system 524 positioned between the illumination source 506 and the beamsplitter 516, a shared relay sub-system 526 positioned between the beamsplitter 516 and the objective lens 510, and a collection relay sub-system 528 positioned between the beamsplitter 516 and the detector 520.

For example, an intermediate relay plane 527 common to the illumination relay sub-system 524, the collection relay sub-system 528, and/or the shared relay sub-system 526 may be located near the beamsplitter 516. The illumination relay sub-system 524 and the shared relay sub-system 526 may thus together provide an aberration-corrected relay of an illumination plane 521 (e.g. an illumination pupil plane, an image of the illumination source, or the like) for illumination of the sample 512. Accordingly, illumination at the intermediate relay plane 527 generated by the illumination source 506 may be further relayed by the shared relay sub-system 526 to an objective relay plane 523. In this regard, the objective lens 510 may illuminate the sample 512 with any distribution of illumination such as, but not limited to critical illumination or Köhler illumination.

By way of another example, the shared relay sub-system 526 and the collection relay sub-system 528 may together provide an aberration-corrected relay of radiation emanating from the sample 512 to the detector 520. In one instance, a pupil plane associated with the angular distribution of radiation from the sample 512 (e.g. at the objective relay plane 523) may be relayed to a detector relay plane 525. For example, as illustrated in FIG. 5B, the detector 520 may be located at the detector relay plane 525. In another instance, although not shown, an additional lens may provide an image of the sample 512 on the detector 520 based on the detector pupil plane 525.

The illumination relay sub-system 524, the collection relay sub-system 528, and the shared relay sub-system 526 may include any configuration of optical elements suitable for generating aberration-corrected relay planes. In one embodiment, each of the illumination relay sub-system 524, the collection relay sub-system 528, and the shared relay sub-system 526 may include at least two optical elements having perpendicular tilt axes to at least partially correct for aberrations associated with tilted orientations of the at least two optical elements. Further, the shared relay sub-system 526 may be rotated orthogonal to both the illumination relay sub-system 524 and the collection relay sub-system 528 such that aberrations induced by the shared relay sub-system 526 are orthogonal to aberrations induced by the illumination relay sub-system 524 and/or the collection relay sub-system 528. In this regard, the intermediate relay plane 527 may be corrected for aberrations over at least a portion of the field (e.g. a central portion as illustrated by the waveform aberration plots of FIG. 3C, or the like). For example, the illumination relay sub-system 524 may include a first illumination optical element 530 having a first illumination tilt axis orthogonal to a second illumination tilt axis of a second illumination optical element 532. By way of another example, the shared relay sub-system 526 may include a third illumination optical element 534 having a third illumination tilt axis orthogonal to a fourth illumination tilt axis of a fourth illumination optical element 536. The third tilt axis may be, but is not required to be orthogonal to the second tilt axis. By way of another example, the collection relay sub-system 528 may include a fifth illumination optical element 538 having a fifth illumination tilt axis orthogonal to a sixth illumination tilt axis of a sixth illumination optical element 540. The fifth tilt axis may be, but is not required to be, orthogonal to the third tilt axis.

In another embodiment, each of the illumination relay sub-system 524, the collection relay sub-system 528, and the shared relay sub-system 526 may include at least two optical elements having parallel tilt axes, but tilt axes of optical elements of the shared relay sub-system 526 are orthogonal to tilt axes of both the illumination relay sub-system 524 and the collection relay sub-system 528. In this regard, intermediate images created at the intermediate image plane 527 may not be fully corrected for aberration, but the relay plane generated by the combination of the illumination relay sub-system 524 and the shared relay sub-system 526 (e.g. at the objective relay plane 523) as well as the detector relay plane 525 generated by the combination of the shared relay sub-system 526 and the collection relay sub-system 528 may be aberration-corrected. For example, the illumination relay sub-system 524 may include a first illumination optical element 530 having a first illumination tilt axis parallel to a second illumination tilt axis of a second illumination optical element 532. By way of another example, the shared relay sub-system 526 may include a third illumination optical element 534 having a third illumination tilt axis orthogonal to the second illumination tilt axis and parallel to a fourth illumination tilt axis of a fourth illumination optical element 536. By way of another example, the collection relay sub-system 528 may include a fifth illumination optical element 538 having a fifth illumination tilt axis orthogonal to the third illumination optical element 534 and parallel to a sixth illumination tilt axis of a sixth illumination optical element 540.

Figure 5C:
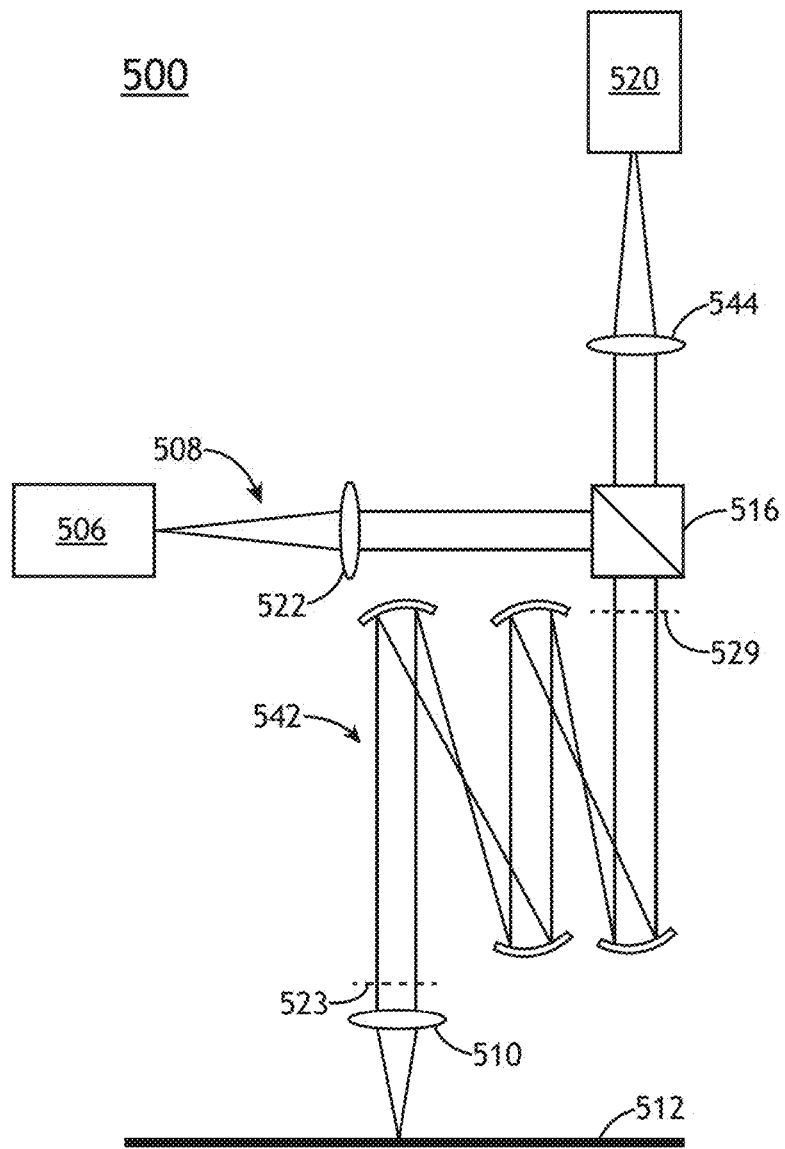
FIG. 5C is a conceptual view of a metrology system including a single optical relay system suitable for relaying both illumination from an illumination source as well as radiation emanating from a sample, in accordance with one or more embodiments of the present disclosure.

FIG. 5C is a conceptual view of the metrology system 500 including a single optical relay system 542 located between the beamsplitter 516 and the objective lens 510 suitable for relaying both illumination from illumination source 506 as well as radiation emanating from the sample 512, in accordance with one or more embodiments of the present disclosure. In one embodiment, the optical relay system 542 includes four tilted reflective optical elements (e.g. tilted about four or more tilt axes) oriented to produce an aberration-corrected relay. The four or more tilt axes may be oriented in any configuration suitable for correcting aberrations induced by the configuration of the four tilted reflective optical elements (e.g. as illustrated in FIGS. 3D through 4 and associated descriptions). In one embodiment, the optical relay system 542 may relay an input plane 529 (e.g. located near a beamsplitter 516) to an objective relay plane 523 (e.g. the back focal plane of the objective lens 510, or the like). For example, the input plane 529 may include, but is not limited to, an illumination pupil plane or an image of the illumination source 506. In this regard, the objective lens 510 may illuminate the sample 512 with any type of illumination such as, but not limited to critical illumination or Köhler illumination. In another embodiment, the optical relay system 542 may relay radiation emanating from the sample located at the objective relay plane 523 to the input plane 529. For example, a pupil plane associated with the angular distribution of radiation emanating from the sample 512 located at the objective relay plane 523 may be relayed by the optical relay system 542. Further, as illustrated in FIG. 5C, an additional lens 544 may provide an image of the sample 512 on the detector 520 based on the radiation emanating from the sample 512 at the input plane 529.

It is noted herein that the depictions of specific embodiments of the pupil relay 100 in FIGS. 5A through 5C are provided for illustrative purposes and should not be interpreted as limiting the present disclosure. In a general sense, the metrology system 500 may include any number of optical elements oriented in any configuration suitable for providing one or more aberration-corrected relay planes. For example, the metrology system 500 may include any number of optical relays formed by any number of optical relay sub-systems.

A metrology system incorporating multiple metrology tools is generally described in U.S. Pat. No. 7,933,026, issued on Apr. 26, 2011, and U.S. Pat. No. 7,478,019, issued on Jan. 13, 2009, both of which are incorporated herein by reference in their entirety. Focused beam ellipsometry based on primarily reflective optics is generally described in U.S. Pat. No. 5,608,526, issued on Mar. 4, 1997, which is incorporated herein by reference in its entirety. The use of apodizers to mitigate the effects of optical diffraction causing the spread of the illumination spot beyond the size defined by geometric optics is generally described in U.S. Pat. No. 5,859,424, issued on Jan. 12, 1999, which is incorporated herein by reference in its entirety. The use of high-numerical-aperture tools with simultaneous multiple angle-of-incidence illumination is generally described by U.S. Pat. No. 6,429,943, issued on Aug. 6, 2002, which is incorporated herein by reference in its entirety.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically interactable and/or physically interacting components and/or wirelessly interactable and/or wirelessly interacting components and/or logically interactable and/or logically interacting components.

The herein described subject matter sometimes illustrates optical rays propagating between or through optical elements. It is to be understood that the depiction of optical rays in figures and/or written description are merely provided for illustrative purposes to illustrate certain aspects of the propagation of light through an optical system. However, it is noted that the use of optical rays may not fully describe all aspects of the propagation of light through the optical system such as, but not limited to diffraction or interference effects. It is to be further understood that the depiction of optical rays does not limit any aspect of the propagation of light through an optical system.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An optical relay system, comprising:
   four or more reflective optical elements oriented in a tilted configuration, wherein each of the four or more reflective optical elements is tilted about one of four or more tilt axes, wherein the four or more tilt axes are oriented to correct for aberrations induced by the tilted configuration.

2. The optical relay system of claim 1, wherein the four or more reflective optical elements comprise:
   at least one spherical reflective optical element.

3. The optical relay system of claim 1, wherein the four or more tilt axes are oriented to correct for at least one of astigmatism or coma.

4. The optical relay system of claim 1, wherein the tilted configuration is an obscuration-free configuration.

5. The optical relay system of claim 1, wherein the four or more reflective optical elements provide an afocal relay of an input optical plane to an output relay plane.

6. The optical relay system of claim 5, wherein the input optical plane is a pupil plane.

7. The optical relay system of claim 1, wherein the four or more reflective optical elements comprise:
   a first optical relay sub-system, wherein the first optical relay sub-system is configured to relay an input optical plane to an intermediate relay plane, wherein the first optical relay sub-system includes a first reflective optical element tilted about a first tilt axis and a second reflective optical element tilted about a second tilt axis; and
   a second optical relay sub-system, wherein the second optical relay sub-system is configured to relay the intermediate relay plane to an output relay plane, wherein the second optical relay sub-system includes a third reflective optical element tilted about a third tilt axis and a fourth reflective optical element tilted about a fourth tilt axis.

8. The optical relay system of claim 7, wherein the second optical relay sub-system is oriented to correct for aberrations induced by the first optical relay sub-system.

9. The optical relay system of claim 7, wherein the second optical relay sub-system is rotated with respect to the first optical relay sub-system about an optical axis common to the first optical relay sub-system and the second optical relay sub-system.

10. The optical relay system of claim 9, wherein the second optical relay sub-system is rotated 90 degrees with respect to the first optical relay sub-system about the optical axis common to the first optical relay sub-system and the second optical relay sub-system such that the output relay plane is corrected for aberrations.

11. The optical relay system of claim 7, wherein the second tilt axis is orthogonal to the first tilt axis to at least partially correct for aberrations induced by the first reflective optical element, wherein the fourth tilt axis is orthogonal to the third tilt axis to at least partially correct for aberrations induced by the third reflective optical element.

12. The optical relay system of claim 7, wherein the first tilt axis is parallel to the second tilt axis, wherein the third tilt axis is orthogonal to the second tilt axis, wherein the third tilt axis is parallel to the fourth tilt axis.

13. A metrology system, comprising:
   an illumination source;
   an optical relay system comprising four or more reflective optical elements oriented in a tilted configuration, wherein each of the four or more reflective optical elements is tilted about one of four or more tilt axes, wherein the four or more tilt axes are oriented to correct for aberrations induced by the tilted configuration;
   an objective lens, wherein the optical relay system is configured to relay illumination from the illumination source at an input plane to an objective relay plane, wherein the objective lens is configured to direct the illumination from the illumination source at the relay plane to a sample, wherein the objective lens is configured to direct radiation emanating from the sample to the objective relay plane, wherein the optical relay system is configured to relay the radiation emanating from the sample at the relay plane to the input plane;
   a detector; and
   one or more collection optical elements configured to direct the radiation emanating from the sample at the relay plane to the detector.

14. The metrology system of claim 13, wherein the four or more reflective optical elements comprise:
   at least one spherical reflective optical element.

15. The metrology system of claim 13, wherein the four or more tilt axes are oriented to correct for at least one of astigmatism or coma.

16. The metrology system of claim 13, wherein the tilted configuration is an obscuration-free configuration.

17. The metrology system of claim 13, wherein the optical relay system is an afocal pupil relay system.

18. The metrology system of claim 13, wherein the four or more reflective optical elements comprise:
   a first optical relay sub-system, wherein the first optical relay sub-system includes a first reflective optical element tilted about a first tilt axis and a second reflective optical element tilted about a second tilt axis; and
   a second optical relay sub-system, wherein the second optical relay sub-system includes a third reflective optical element tilted about a third tilt axis and a fourth reflective optical element tilted about a fourth tilt axis.

19. The metrology system of claim 18, wherein the second optical relay sub-system is oriented to correct for aberrations induced by the first optical relay sub-system.

20. The metrology system of claim 18, wherein the second optical relay sub-system is rotated with respect to the first optical relay sub-system about an optical axis common to the first optical relay sub-system and the second optical relay sub-system.

21. The metrology system of claim 20, wherein the second optical relay sub-system is rotated 90 degrees with respect to the first optical relay sub-system about the optical axis common to the first optical relay sub-system and the second optical relay sub-system such that the output relay plane is corrected for aberrations.

22. The metrology system of claim 18, wherein the second tilt axis is orthogonal to the first tilt axis to at least partially correct for aberrations induced by the first reflective optical element, wherein the fourth tilt axis is orthogonal to the third tilt axis to at least partially correct for aberrations induced by the third reflective optical element.

23. The metrology system of claim 18, wherein the first tilt axis is parallel to the second tilt axis, wherein the third tilt axis is orthogonal to the second tilt axis, wherein the third tilt axis is parallel to the fourth tilt axis.

24. A metrology system, comprising:
   an illumination source;
   an objective lens;
   a detector;
   a first optical relay sub-system, wherein the first optical relay sub-system includes a first reflective optical element tilted about a first tilt axis and a second reflective optical element tilted about a second tilt axis, wherein the first optical relay sub-system is configured to relay illumination from the illumination source at an illumination plane to an intermediate relay plane;
   a second optical relay sub-system, wherein the second optical relay sub-system includes a third reflective optical element tilted about a third tilt axis and a fourth reflective optical element tilted about a fourth tilt axis, wherein the second optical relay sub-system is configured to relay the illumination from the illumination source at the intermediate relay plane to an objective relay plane, wherein the first, second, third, and fourth reflective optical elements are oriented in a first tilted configuration, wherein the first, second, third, and fourth tilt axes are oriented to correct for aberrations induced by the first tilted configuration, wherein the objective lens is configured to direct the illumination from the illumination source to a sample, wherein the objective lens is configured to direct radiation emanating from the sample to the objective relay plane, wherein the second optical relay sub-system is configured to relay the radiation emanating from the sample at the objective relay plane to the intermediate relay plane; and
   a third optical relay sub-system, wherein the third optical relay sub-system includes a fifth reflective optical element tilted about a fifth tilt axis and a sixth reflective optical element tilted about a sixth tilt axis, wherein the third optical relay sub-system is configured to relay the radiation emanating from the sample at the intermediate relay plane to the detector, wherein the third, fourth, fifth, and sixth reflective optical elements are oriented in a second tilted configuration, wherein the third, fourth, fifth, and sixth tilt axes are oriented to correct for aberrations induced by the second tilted configuration.

25. The metrology system of claim 24, wherein at least one of the first, second, third, fourth, fifth, or sixth reflective optical elements comprise:
   a spherical reflective optical element.

26. The metrology system of claim 24, wherein at least one of the first tilted configuration or the second tilted configuration comprises:
   an obscuration-free configuration.

27. The optical relay of claim 24, wherein the second optical relay sub-system is rotated with respect to the first optical relay sub-system about an optical axis common to the first optical relay sub-system and the second optical relay sub-system.

28. The optical relay of claim 27, wherein the second optical relay sub-system is rotated with respect to the third optical relay sub-system about an optical axis common to the third optical relay sub-system and the second optical relay sub-system.

29. The optical relay of claim 28, wherein the second tilt axis is orthogonal to the first tilt axis to at least partially correct for aberrations induced by the first reflective optical element, wherein the fourth tilt axis is orthogonal to the third tilt axis to at least partially correct for aberrations induced by the third reflective optical element, wherein the sixth tilt axis is orthogonal to the fifth tilt axis to at least partially correct for aberrations induced by the fifth reflective optical element.

* * * * *